US006132892A

United States Patent [19]

Yoshikawa et al.

[11] Patent Number: 6,132,892

[45] Date of Patent: Oct. 17, 2000

[54] SOFT MAGNETIC ALLOY FILM AND MANUFACTURING METHOD THEREOF, AND MAGNETIC HEAD INCORPORATING THE SAME

[75] Inventors: Masatoshi Yoshikawa; Hiroaki Yoda, both of Kawasaki; Susumu Hashimoto, Ebina, all of Japan

[73] Assignee: Kabushiki Kaisha Toshiba, Kawasaki, Japan

[21] Appl. No.: 09/154,514

[22] Filed: Sep. 16, 1998

[30] Foreign Application Priority Data

Sep. 17, 1997 [JP] Japan .................................... 9-252485
Sep. 14, 1998 [JP] Japan .................................... 10-260638

[51] Int. Cl.[7] .................................... G11B 5/66

[52] U.S. Cl. .................... 428/692; 428/694 R; 428/694 T; 428/900; 360/113; 324/252; 338/32 R; 204/191.2

[58] Field of Search .................................... 428/692, 694 T, 428/900, 694 R; 360/113; 324/252; 338/32 R; 204/192.2

[56] References Cited

U.S. PATENT DOCUMENTS

| | | | |
|---|---|---|---|
| 4,567,116 | 1/1986 | Sawada | 428/694 T |
| 5,466,539 | 11/1995 | Takayama | 428/611 |
| 5,496,631 | 3/1996 | Tamari | 428/332 |
| 5,573,863 | 11/1996 | Hayakawa | 428/634 T |
| 5,585,196 | 12/1996 | Inomata | 428/557 |
| 5,780,177 | 7/1998 | Tomita et al. | 428/692 |

FOREIGN PATENT DOCUMENTS

| | | |
|---|---|---|
| 3-132005 | 6/1991 | Japan . |
| 5-39550 | 2/1993 | Japan . |
| 5-39580 | 2/1994 | Japan . |
| 6-36928 | 2/1994 | Japan . |
| 6-53040 | 2/1994 | Japan . |

*Primary Examiner*—Leszek Kiliman
*Attorney, Agent, or Firm*—Oblon, Spivak, McClelland, Maier & Neustadt, P.C.

[57] ABSTRACT

A soft magnetic alloy film is essentially consisted of a magnetic alloy having a composition expressed by $(Fe_{1-a-b}Co_aNi_b)_{100-X}R_X$ (R is at least one kind of element selected from rare earth elements including Y, $0 \leqq a < 1$, $0 \leqq b < 1$, $0 \leqq a+b < 1$, $0 < x \leqq 10$ at %). A soft magnetic alloy film has a first phase consisting of a crystal phase, and a second phase different in crystal structure from the first phase. The first phase is composed of crystal phase having, for instance, body-centered cubic structure. The second phase is composed of, for instance, amorphous phase containing R element and/or crystal phase having crystal structure other than body-centered cubic structure containing R element. Since the first phase and the second phase are different each other in their crystal structures, grain growth can be suppressed. Therefore, while maintaining high saturation magnetic flux density which Fe, Fe—Co alloy or Fe—Co—Ni alloy possess, soft magnetic properties can be enhanced. Further, stability of film structure and the like can be heightened.

24 Claims, 13 Drawing Sheets

θ50 : FULL-WIDTH AT HALF MAXIMUM

[100]

[110]

[111]

[100]

[110]

[111]

SOFT MAGNETIC ALLOY FILM AND MANUFACTURING METHOD THEREOF, AND MAGNETIC HEAD INCORPORATING THE SAME

BACKGROUND OF THE INVENTION

1. Field of the Invention

The present invention relates to a soft magnetic film being used for a recording magnetic pole of a magnetic head, a thin film inductor, various kinds of thin film sensors and the like and manufacturing method thereof, and a magnetic head using thereof.

2. Description of the Related Art

In recent years, high densification of recording density is strongly demanded in the field of magnetic recording. In response to this demand, a recording bit on a recording medium is made fine. The fine recording bit is likely to be disturbed thermally. Therefore, in order to secure thermal stability of the recording bit, a recording medium of higher coercive force has been used.

To respond to higher coercive force of recording medium side, a magnetic head capable of generating higher recording magnetic field is required. To enhance recording magnetic field of a magnetic head, soft magnetic material of high saturation magnetic flux density is indispensable as material of magnetic pole. Soft magnetic material serving as material of magnetic pole is important to further possess low coercive force and high permeability, soft magnetic material having these magnetic properties at the same time is required.

As soft magnetic materials being employed conventionally for thin film magnetic heads, various materials such as ferrite, Sendust alloy, Co based amorphous alloy and the like have been developed. However, ferrite is such low in its saturation magnetic flux density as less than 10 kG, it is not suitable for high density recording due to higher coercive force of magnetic recording medium. Saturation magnetic flux density of Sendust alloy is higher than ferrite, but is approximately 10 kG, it can not sufficiently respond to higher density recording. Co based amorphous alloy is low in its crystallization temperature, causes accordingly thermal instability in the manufacturing process of a thin film magnetic head, resulting in inability of obtaining high permeability, high specific resistance inherent to amorphous alloy.

In recent years, with an object to attain high densification of saturation magnetic flux, various materials of soft magnetic thin film having Fe as a main component have been proposed. For instance, it is known to obtain soft magnetic properties by making small effective magnetocrystalline anisotropy through micro-crystallization of grains which have Fe as a main component. However, this method requires addition of approximately 10 to 20% of additional elements such as Zr, Nb, Hf, Ti, Ta and N, B, C to obtain thermal stability of micro-crystalline grains, the upper limit of saturation magnetic flux density was about 18 kG. Even if such an alloy film is made soft magnetic, its saturation magnetic flux density does not exceed that of pure Fe (21.5 kG).

In future, it is expected that further higher densification of recording density will be demanded. In such a case, soft magnetic material of still high saturation magnetic flux density is necessary. From such a view-point, Fe—Co alloy of the highest saturation magnetic flux density among alloys is attracting attention. However, Fe—Co alloy, in a composition of saturation magnetic flux density higher than Fe, is known to possess large magnetostriction and magnetocrystalline anisotropy. Therefore, it was very difficult to make it soft magnetic.

Additional element is added to Fe—Co alloy to make micro-crystalline, even if being made soft magnetic thereby, in that case, the additional element is required to be added much. Therefore, high saturation magnetic flux density of the Fe—Co alloy can not be maintained.

On the other hand, a method is proposed in which, through addition of rare earth elements to the Fe—Co alloy to lower its large saturation magnetostriction, excellent soft magnetic properties are obtained (Ref. to Japanese Patent Laid-open Application Numbers Hei-5-39550 and Hei-6-53040). Here, by substituting rare earth element in the Fe—Co alloy to be supersaturated solid solution, a body-centered cubic structure is maintained through a whole film. According to the reason disclosed in that, when the rare earth element is added much, amorphous phase appears to deteriorate the saturation magnetic flux density.

Further, the rare earth elements to be added are restricted to 3 elements of Sm, Ho, Tm. The reason for this is that, when substitution solid solution is prepared with addition of rare earth element, only these 3 elements give lowering effect of magnetostriction. Further, because of single phase of body-centered cubic structure, sufficient microcrystallization is difficult, accordingly coercive force can not be fully reduced to be used for magnetic head and the like.

In addition, there are such difficulties that, since the soft magnetic alloy film in which rare earth element (Sm, Ho, Tm) is supersaturated in substitution solid solution of Fe—Co alloy is thermally unstable, almost of the film tends to be amorphous to cause deterioration of saturation magnetic flux density.

In order to incorporate such an alloy film as a material of a magnetic pole of a magnetic head, the soft magnetic properties such as permeability and coercive force are insufficient and are desired to be further improved.

SUMMARY OF THE INVENTION

Therefore, an object of the present invention is to provide a soft magnetic alloy film which, while maintaining the saturation magnetic flux density which Fe, Fe—Co alloy or Fe—Co—Ni alloy possess, is enhanced in soft magnetic properties and at the same time is improved in thermal stability of film structure. In particular, the present object is to provide a soft magnetic alloy film in which the high saturation magnetic flux density of the Fe—Co alloy and excellent soft magnetic properties are satisfied at the same time. Another object of the present invention is to provide a magnetic head in which, by use of such a soft magnetic alloy film as a material of magnetic pole, intensity of recording magnetic field and the like are enhanced. Still another object of the present invention is to provide a manufacturing method of a soft magnetic film which made possible to invest excellent soft magnetic properties to Fe, Fe—Co alloy or Fe—Co—Ni alloy of high saturation magnetic flux density.

A soft magnetic alloy film of the present invention is essentially consisting of magnetic alloy having composition expressed by $$\text{General formula: } (Fe_{1-a-b}Co_aNi_b)_{100-X}R_X \quad (1)$$

(here, R denotes at least one kind of element selected from rare earth elements including Y, a, b and x satisfy $0 \leqq a<1$, $0 \leqq b<1$, $0 \leqq a+b<1$, $0<x \leqq 10$ at %), and is characterized in having a first phase consisting of crystal phase, and a second phase of crystal structure different from that of the first phase.

In the soft magnetic alloy film of the present invention, the first phase has Fe, Fe—Co or Fe—Co—Ni as its main component, and is composed of at least one kind of crystal phase selected from body-centered cubic structure, face-centered cubic structure and hexagonal closest packed structure, in particular, the first phase is characterized in possessing body-centered cubic structure of which the main component is Fe—Co or Fe—Co—Ni. In this case, the value of 1−a−b in the aforementioned formula (1) is set in the range of $0.3 \leqq 1-a-b \leqq 0.95$. The second phase is constituted of, for instance, an amorphous phase or a compound phase or a crystal phase different from the first phase, all of which includes R element.

A second soft magnetic alloy film of the present invention is essentially consisting of magnetic alloy having composition expressed by $$\text{general formula: } Fe_{1-a-b}Co_aNi_b \quad (2)$$

(in the formula, a and b satisfy $0 \leqq a<1$, $0 \leqq b<1$, $0 \leqq a+b<1$), and is characterized in having a first phase consisting of body-centered cubic structure of which main component is Fe, Fe—Co or Fe—Co—Ni, a second phase consisting of face-centered cubic structure of which main component is Fe, Fe—Co or Fe—Co—Ni, and average grain diameter of the first phase being larger than that of the second phase, and the first phase occupying 50% or more of film texture. Here, in the first phase, (110) plane is preferable to be grown in parallel with respect to film plane.

A third soft magnetic alloy film of the present invention is essentially consisting of magnetic alloy having composition expressed by $$\text{general formula: } Fe_{1-a-b}Co_aNi_b \quad (3)$$

(in the formula, a and b satisfy $0 \leqq a<1$, $0 \leqq b<1$, $0 \leqq a+b<1$), wherein the film, as a whole, is consisting of a phase of body-centered cubic structure of which main component is Fe, Fe—Co or Fe—Co—Ni, and grain diameter is in the range of 50 nm or less, and (110) plane is grown in parallel with respect to the film plane of the soft magnetic alloy film.

A magnetic head of the present invention comprises a magnetic gap disposed so as to position on an air bearing surface, a pair of magnetic poles which are disposed so as to sandwich the magnetic gap, and at least one of which has the aforementioned soft magnetic alloy film of the present invention, and a coil disposed so as to intersect with the magnetic poles between the pair of magnetic poles.

It is known that, in general, in a material large in its magneto-crystalline anisotropy such as Fe, Fe—Co alloy or Fe—Co—Ni alloy, by lowering effective magnetic anisotropy by making fine the grains, excellent soft magnetic properties can be obtained. In the present invention, the first phase consisting of a crystal phase of which the main component is Fe, Fe—Co or Fe—Co—Ni, and the second phase different in its crystal structure from that of the first phase are made to appear. Due to difference of the crystal structures of the first phase and the second phase, respective grains are not combined/coalesced to grow, resulting in fine grains. That is, the second phase suppresses growth of the grains of the first phase which bears mainly magnetic properties.

Thus, through making fine the grains of the first phase and the second phase, the effective magneto-crystalline anisotropy of the respective phases can be lowered. Therefore, to the soft magnetic alloy film having these first phase and second phase, excellent soft magnetic properties can be invested. Further, the R elements enhancing formation of such EL fine structure are mainly contained in the second phase except for that is dissolved unavoidably in the first phase, and are precipitated in the soft magnetic alloy film, the R elements accordingly do not deteriorate the thermal stability of the soft magnetic alloy film.

From the aforementioned, the soft magnetic alloy film of the present invention can maintain the saturation magnetic flux density which Fe, Fe—Co alloy or Fe—Co—Ni alloy possesses, and, at the same time, can invest excellent soft magnetic properties based on fine grains. Further, such magnetic properties are made possible to be maintained with stability. In particular, through constitution of the first phase with a crystal phase which has Fe—Co or Fe—Co—Ni as a L main component and has body-centered cubic crystal structure, high saturation magnetic flux density which Fe—Co alloy or Fe—Co—Ni alloy possesses and excellent soft magnetic properties can be satisfied at the same time.

A manufacturing method of a soft magnetic film of the present invention is characterized in manufacturing soft magnetic film in which Fe, Fe—Co or Fe—Co—Ni is main component, and is characterized in having a process of forming the soft magnetic film in a gas atmosphere of which pressure during discharge is 1.0 mTorr or less.

Thus, by forming soft magnetic film of which main component is Fe, Fe—Co or Fe—Co—Ni in a gas atmosphere of which pressure during discharge is 1 mTorr or less, orientation of these soft magnetic films can be remarkably improved. In specific, orientation of (110) plane of Fe, Fe—Co alloy or Fe—Co—Ni alloy which possesses body-centered cubic structure, or (111) plane of Fe—Co alloy or Fe—Co—Ni alloy which possesses face-centered cubic structure can be enhanced. Further, by lowering gas pressure, the film can be made low in its impurity concentration, in particular, in oxygen concentration, and the density of the film becomes high. Therefore, disturbance of the crystal structure around grain boundary can be made small, and effect as pinning site of shift of magnetic wall can be suppressed. Thereby, the soft magnetic properties of the magnetic film of which main component is Fe, Fe—Co or Fe—Co—Ni can be improved.

DESCRIPTION OF THE PREFERRED EMBODIMENTS

In the following, embodiments for carrying out the present invention will be described with reference to drawings.

Figure 1A:
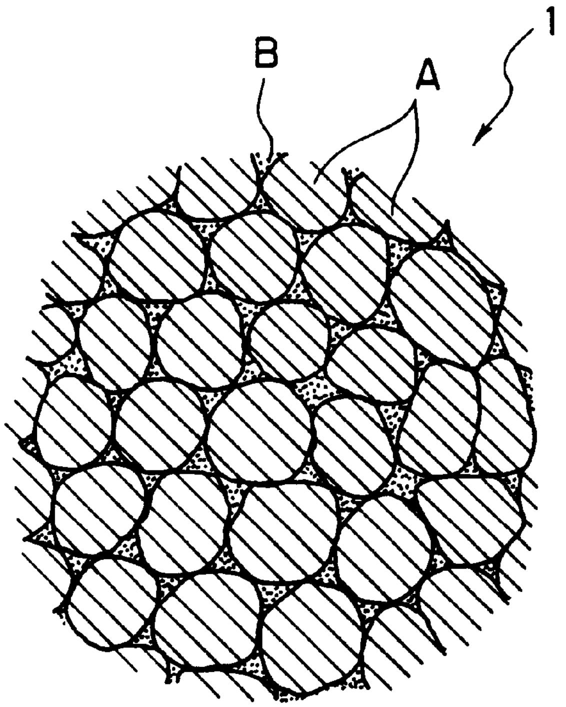
FIG. 1A is a diagram showing schematically a fine structure of one embodiment of a soft magnetic alloy film of the present invention.
Figure 1B:
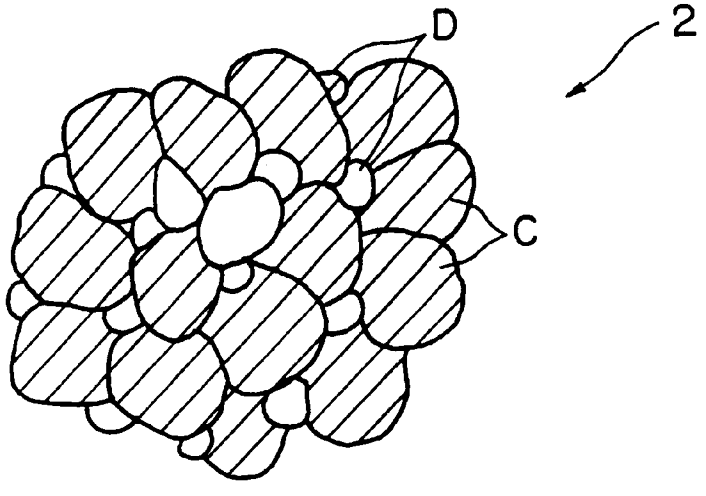
FIG. 1B is a diagram showing schematically a fine structure of another embodiment of a soft magnetic alloy film of the present invention.

FIGS. 1A and 1B are diagrams showing schematically fine structure of one embodiment of a soft magnetic alloy film of the present invention.

Soft magnetic alloy film 1 shown in FIG. 1A has a composition essentially expressed by $$\text{General formula: } (Fe_{1-a-b}Co_aNi_b)_{100-X}R_X \qquad (1)$$

(in the formula, R denotes at least one kind of element selected from rare earth elements including Y, and a, b and x satisfy $0 \leqq a<1$, $0 \leqq b<1$, $0 \leqq a+b<1$, $0 < x \leqq 10$ at %).

The soft magnetic alloy film 1 satisfying such a composition is constituted of a first phase A consisting of a crystal phase of which main component is Fe, Fe—Co or Fe—Co—Ni, and a second phase B of a crystal structure different from the first phase A. A film thickness of the soft magnetic: alloy film 1 is determined in accordance with use. For instance, when it is employed for a magnetic pole of a thin film magnetic head, the film thickness of the soft magnetic alloy film is preferred to be 0.005 to 1.0 μm. Even when being employed for the other use, it is generally preferable to be approximately 0.01 to 5.0 μm.

Here, Fe, Co and Ni are components mainly bearing magnetism of the soft magnetic alloy film 1. Main component of the soft magnetic alloy film 1 can be either one of Fe, Fe—Co and Fe—Co—Ni, further, when Fe—Co and Fe—Co—Ni is main component, its composition is not restricted particularly. Therefore, the first phase A of which main component is Fe, Fe—Co or Fe—Co—Ni is constituted of at least one kind of crystal phase selected from body-centered cubic structure, face-centered cubic structure and hexagonal closest packed structure.

Though, for the main component of the soft magnetic alloy film 1, Fe or Fe—Co or Fe—Co—Ni of various kinds of compositions are applicable, as the range of composition of Fe—Co or Fe—Co—Ni in which particularly high saturation magnetic flux density can be obtained, the value of $1-a-b$ in the formula (1) is preferable to be in Fe-rich range of $0.3 \leqq 1-a-b \leqq 0.95$. By setting the value of $1-a-b$ in the range of from 0.3 to 0.95, the first phase A can be constituted of an Fe—Co alloy of body-centered cubic structure in which large saturation magnetic flux density can be obtained.

The R elements are elements enhancing formation of the second phase B which will be described later in detail, various kinds of rare earth elements including Y such as Y, Ce, Pr, Nd, Sm, Eu, Gd can be employed. Among them, Sm in particular shows a large effect in lowering of magnetostriction of the soft magnetic alloy film 1, therefore, is preferable element as the R element.

Content x of the R element is set in the range of $0<x \leqq 10$ at %. When the content of the R element exceeds 10 at %, content of Fe, Fe—Co or Fe—Co—Ni decreases relatively, thereby properties such as saturation magnetic flux are deteriorated. Further, in view of binary phase diagrams of Fe—R, Co—R and Ni—R, when the content of the R element exceeds 10 at %, almost of the soft magnetic alloy film becomes amorphous, accordingly it is probable that the first phase A consisting of the crystal phase can not exist. When the film becomes amorphous as a whole, though the soft magnetic properties can be in some cases maintained a certain degree, the saturation magnetic flux density decreases remarkably, resulting in inability of attaining the object of the present invention.

The content of the R element is preferable to be as little as possible in the range not disturbing generation of the second phase B. From the point of view of maintaining more larger saturation magnetic flux density, the content of the R elements is desirable to be 5 at % or less. Incidentally, when the content of the R element is too slight, generating amount of the second phase B is slight, resulting in likelihood of not capable of investing excellent soft magnetic properties to the soft magnetic alloy film 1. Therefore, the content of the R element is preferable to be 0.5 at % or more.

Soft magnetic alloy film 1 can contain Ni. When Ni is added, through adjustment of composition, magnetostriction can be made small, at the same time, corrosion resistance can be enhanced. Further, the phase having face-centered cubic structure of the first phase or the second phase can be formed with stability. In order to make larger the saturation magnetic flux density than Fe, Ni is preferred to be added 80 at % or less.

The soft magnetic alloy film 1 may contain at least one kind of element selected from N, C and B. These elements easily combine with the R element to form compound. This suppresses grain growth and enhance microcrystallization. However, when too much of these elements are contained, saturation magnetic flux density of the soft magnetic alloy film 1 becomes remarkably low. Therefrom, it content should be 5.0 at % or less.

The soft magnetic alloy film 1 may further contain at least one kind of element selected from Ti, Ta, Hf, Al, Zr, Cr, V, Po, W, Mn and Nb. These elements easily combine with the aforementioned N, C and B to form compound. Thereby, grain growth can be suppressed. However, when too much of these elements is contained, the saturation magnetic flux density of the soft magnetic alloy film 1 becomes remarkably low, accordingly the content is set at 5.0 at % or less.

The soft magnetic alloy film 1 may further contain at least one kind of element selected from Au, Ag, Rh, Ru, Cu, Pt, Pd and Ir. Through addition of these elements, the soft magnetic alloy film can be enhanced in corrosion resistance. However, when too much of the aforementioned elements is contained, the saturation magnetic flux density of the soft magnetic alloy film 1 becomes remarkably low, accordingly the content is set at 5.0 at % or less. Among them, Cu possesses very large effect in making fine the grains, resulting in excellent soft magnetism.

A soft magnetic alloy film 1, as shown in FIG. 1A, possesses a fine-structure in which a second phase B different in crystal structure from a first phase A is disposed surrounding the first phase A consisting of a crystal phase in which Fe, Fe—Co or Fe—Co—Ni is main component. The second phase B contains at least R element, consists of amorphous phase, crystal phase different from the first phase A, segregated phase of R elements and the like. The second phase B can be precipitated by heat treating after formation of the soft magnetic alloy film 1, or, has been formed during film formation depending on the film formation method.

The first phase A and the second phase B, in order to L maintain high saturation magnetic flux density, are preferable both to be ferromagnetic phase. Further, if the second phase has minus magnetostriction, saturation magnetostriction of the film can be preferably reduced as a whole.

The first phase A is a phase for mainly maintaining high saturation magnetic flux density. The second phase functions mainly as a phase suppressing grain growth. Therefore, the second phase B is likely to be low in saturation magnetic flux density. From the view-point of enhancing saturation magnetic flux density of the soft magnetic alloy film 1, low ratio of the second phase B is preferable. In specific, the ratio of the second phase B which occupies in the soft magnetic alloy film 1, as a ratio of areas in film plane, is preferable to be 20% or less. The ratio of the second phase B is further preferable to be 10% or less as a ratio of areas. However, if the ratio of the second phase B is too low, since the function of suppressing grain growth of the first phase A is decreased, the ratio of the second phase B is preferable to be 2% or more by the ratio of areas. The ratio of the area of the second phase B can be estimated through plane observation with, for instance, electron microscope.

All the average grain diameters of an Fe crystal phase, an Fe—Co crystal phase or an Fe—Co—Ni crystal phase constituting the first phase A are preferable to be 50 nm or less. When the average grain diameter of either one of these first phase A and second phase B grows to the grain diameter which exceeds 50 nm, magneto-crystalline anisotropy which Fe, Fe—Co alloy or Fe—Co—Ni alloy has hinders soft magnetic properties of the soft magnetic alloy film 1. In particular, when a crystal phase having body-centered cubic crystal structure exists, since this phase has large magnetocrystalline anisotropy and saturation magnetostriction, its average grain diameter is further preferable to be reduced to 5 nm or more and 20 nm or less. Such fine grains can be realized through existence of 2 phases of A, B different in their crystal structures.

Figure 2:
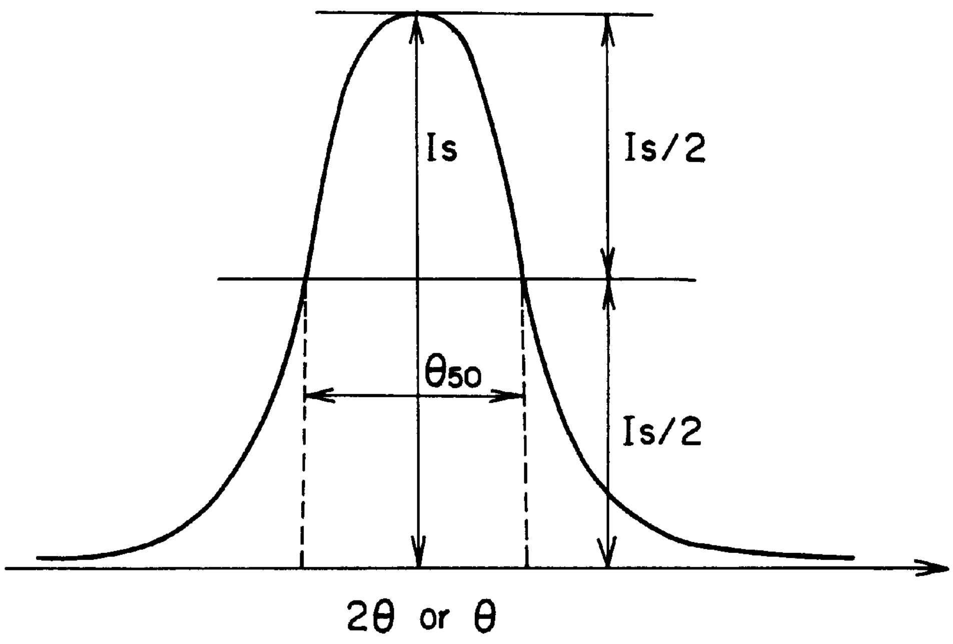
FIG. 2 is a diagram showing full-width at half maximum for obtaining crystalline orientation and average grain diameter of soft magnetic alloy film of the present invention.

Incidentally, the average grain diameters of the respective phases A, B can be obtained from equation of Scherrer with full-widths of respective diffraction peaks due to 2θ scan of X-ray diffraction as shown in, for instance, FIG. 2. Or, when the grain diameter is judged through the plane observation due to an electron microscope, a selected-area iris is inserted into particular portion of diffraction peaks. In a dark-field image, by enhancing contrast between particular grains for which the iris is inserted and the other grains, the grain diameter can be measured, evaluated.

The first phase A is preferred to be a crystal phase consisting of body-centered cubic structure in which Fe—Co or Fe—Co—Ni having particularly high saturation magnetic flux density is its main component. In this case, the value of 1−a−b in the equation (1) is set in the range of $0.3 \leqq 1-a-b \leqq 0.95$. By setting the value of 1−a−b in the range of from 0.3 to 0.95, the first phase A can be constituted of Fe—Co alloy or Fe—Co—Ni alloy of body-centered cubic structure. Thereby, the saturation magnetic flux density of the soft magnetic Lm alloy film 1 can be further enhanced. In particular, in the case of Fe—Co alloy, by setting the value of 1−a−b of the equation (1) in the range of $0.6 \leqq 1-a-b \leqq 0.9$, high saturation magnetization of approximately 2.2 T or more can be materialized.

The first phase A or C having body-centered cubic structure is preferred to be oriented with priority of (110) plane with respect to the film plane. By making the first phase A a crystal phase having body-centered cubic structure which is oriented with priority in (110) plane, saturation magnetostriction can be reduced. Incidentally, the R elements contribute also to reduction of saturation magnetostriction of the first phase A, in particular its effect is large when Sm is employed as the R element.

When a magnetic material having body-centered cubic structure is oriented with priority in (110) plane, if its magnetization was rotated in its oriented plane, the magnetization senses magnetostriction in the saturated plane $\lambda_s^{110}$. The magnetostriction in the saturated plane$\lambda_s^{110}$ is expressed in the following manner with linear magnetostriction of <100> direction X$\lambda^{100}$ and linear magnetostriction of <111> direction $\lambda^{111}$.

$$\lambda_s^{110}=(3\lambda^{100}+5\lambda^{111})/8$$

The linear magnetostriction of Fe—Co alloy or Fe—Co—Ni alloy having body-centered cubic structure is smaller in its $\lambda^{111}$ than $\lambda^{100}$. Therefore, by orienting in (110) plane with kin priority, magnetostriction of (110) plane can be suppressed small. Thereby, magnetization rotation in the plane can be L made less affected by magnetostriction and stress of the film.

Figure 16A:
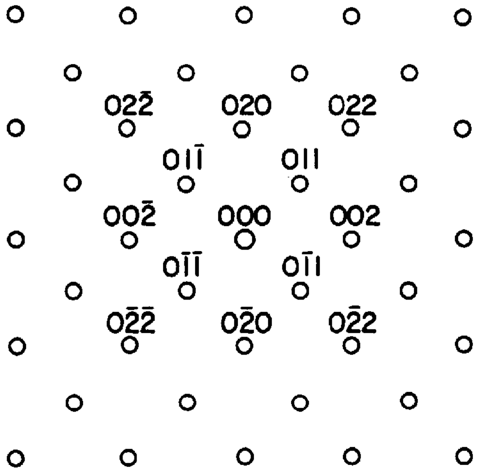
FIG. 16A is a diagram showing electron diffraction pattern of body-centered cubic structure due to [100] incidence.
Figure 16B:
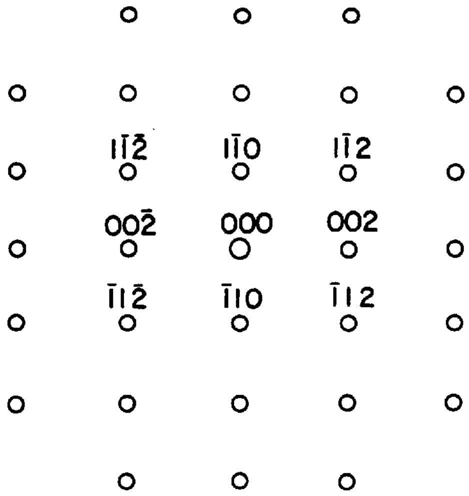
FIG. 16B is a diagram showing electron diffraction pattern of body-centered cubic structure due to [110] incidence.
Figure 16C:
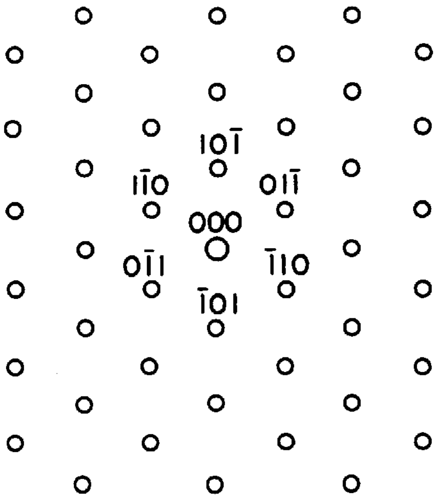
FIG. 16C is a diagram showing electron diffraction pattern of body-centered cubic structure due to [111] incidence.

Here, a state in which (110) plane is grown in parallel with respect to film plane denotes that diffraction peaks due to (110) appear in the X-ray diffraction image, and the integrated intensity of its peaks is larger than the integrated intensity of the other peaks. In this case, a state in which only diffraction peaks due to (110) exist is preferable. Further, the full-width at half maximum of rocking curve of the diffraction peak due to (110) plane is desirable to be 10 degree or less, more preferable to be 5 degree or less. The full-width at half maximum of the rocking curve is shown in FIG. 2. As the other analyzing/evaluating method, it is preferable that spots caused by (110) in diffraction pattern due to observation of the film section with an electron microscope exist, the width of its breadth of the spot has an angle of 13 degree or less with respect to direct spot, more preferable to be 7 degree or less. In FIG. 16A, FIG. 16B, FIG. 16C, electron diffraction patterns of body-centered cubic structure are shown.

The second phase B is composed of an amorphous phase containing the R element or a crystal phase different from the first phase A. As a concrete example of the second phase B, first, amorphous phase containing the R element, compound phases containing the R element such as $R_2$(Fe—Co)$_{17}$, R(Fe—Co)$_2$, R(Fe—Co)$_3$, $R_2$(Fe—Co)$_7$ and R(Fe—Co)$_5$, segregated phase of the R element and the like can be cited. These phases have an effect to suppress too much growth of grains of the first L phase A. In addition, since many of Fe—Co—R alloys, Fe—R alloys, Co—R alloys have large negative magnetostriction, an effect of lowering saturation magnetostriction of the soft magnetic alloy film 1 as a whole is exhibited.

When the second phase B is an amorphous phase or a compound phase of which main component is Fe—Co—R, these are generally hard magnetic materials. Therefore, the average grain diameter of the second phase B is preferable to be made such fine as 2 nm or less to make the second phase B superparamagnetic. Thus, by making the average grain diameter of the second phase B such fine as 2 nm or less, without deteriorating soft magnetic properties of the soft magnetic alloy film 1, grain growth of the first phase A can be suppressed.

The second phase B, when the first phase A has body-centered cubic structure or hexagonal closest packed structure, may be constituted of a crystal phase having face-centered cubic structure containing the R element. The crystal phase having face-centered cubic structure possesses excellent soft magnetic properties, accordingly, while maintaining a function suppressing grain growth of the first phase A, bears a role supplementing soft magnetic properties of the whole film. Further, the R element forms easily solid solution in the crystal phase having face-centered cubic structure, and saturation magnetostriction is inherently small, therefore, it can be made further small due to addition of the R element.

Figure 17A:
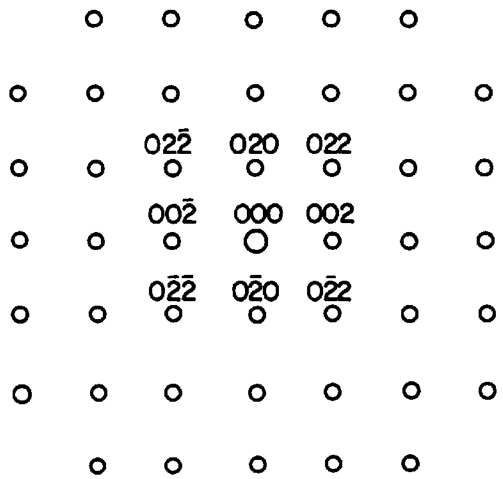
FIG. 17A is a diagram showing electron diffraction pattern of face-centered cubic structure due to [100] incidence.
Figure 17B:
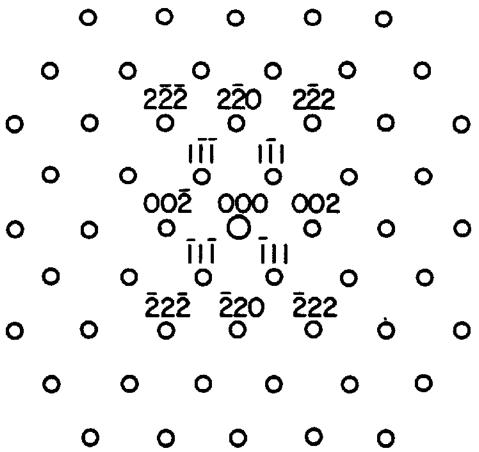
FIG. 17B is a diagram showing electron diffraction pattern of face-centered cubic structure due to [110] incidence.
Figure 17C:
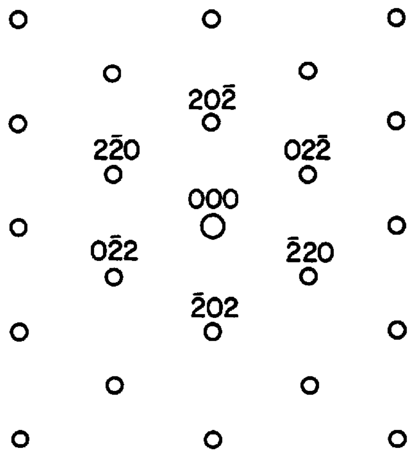
FIG. 17C is a diagram showing electron diffraction pattern of face-centered cubic structure due to [111] incidence.

When the first phase A is constituted of a crystal phase having face-centered cubic structure, the first phase A m is preferable to be oriented in the (111) plane with priority. By orienting a crystal phase having face-centered cubic structure in (111) plane with priority, soft magnetic properties can be further enhanced. Therefore, soft magnetic properties as a whole soft magnetic alloy film 1 can be further enhanced. A state in which crystal plane is oriented with priority can be evaluated with the X-ray diffraction and electron diffraction as aforementioned. In FIG. 17A, FIG. 17B and FIG. 17C, electron diffraction patterns of face-centered cubic structure are shown. Here, the full-width at half maximum of the rocking curve of (111) plane is preferable to be 10 degree or less, further preferable to be 5 degree or less.

As aforementioned, by making appear the first phase A and the second phase B different in their crystal structures each other in the soft magnetic alloy film 1, the grains of respective phases A, B show function of mutually suppressing grain growth. In particular, the second phase B suppresses grain growth of the first phase A which mainly bears magnetic properties. Therefore, grains constituting the soft magnetic alloy film 1, in particular grains of the first phase A mainly bearing magnetic properties, can be made fine. Through making fine the grains, effective magneto-crystalline anisotropy of the respective phases A, B can be made low. In particular, the effective magneto-crystalline anisotropy of the first phase A can be reduced. Therefore, excellent soft magnetic properties can be invested to the soft magnetic alloy film 1. As described above, the second phase B also can in some cases contribute in enhancing the soft magnetic properties.

Since the first phase A is constituted of a crystal phase consisting of, except for unavoidably dissolved R elements, Fe, Fe—Co or Fe—Co—Ni, high saturation magnetic flux density which Fe phase, Fe—Co phase or Fe—Co—Ni phase inherently possesses can be maintained. In this case, when the first phase A is composed of body-centered cubic structure of which main component is Fe—Co or Fe—Co—Ni, particularly large saturation magnetic flux density can be obtained. Further, the grain growth of the first phase A due to heat can be suppressed by the second phase B, the thermal stability of the first phase A can be accordingly heightened. The R element, except for that dissolved unavoidably in the first phase, is precipitated in the soft magnetic alloy film 1 contained mainly in the second phase B, the R element does not accordingly lower the thermal stability of the soft magnetic alloy film 1.

The soft magnetic alloy film 1, while maintaining the high saturation magnetic flux density which Fe phase, Fe—Co phase or Fe—Co—Ni phase possesses inherently, shows excellent soft magnetic properties. Further, the soft magnetic alloy film 1, being excellent in thermal stability, can maintain with stability excellent saturation magnetic flux density and excellent soft magnetic properties. Such a soft magnetic alloy film 1 is particularly suitable for a material of magnetic pole of a thin film magnetic head.

The soft magnetic alloy film 1 having such a fine structure as aforementioned can be obtained by sputtering, for instance, Fe—R alloy or Fe—Co—R alloy target, composite target disposed R chips on Fe or Fe—Co alloy target and the like. By sputtering, with Fe or Fe—Co alloy target, and Fe—R compound or Fe—Co—R compound target, in dual mode and simultaneously, the soft magnetic alloy film 1 can be obtained identically as well.

When the soft magnetic alloy film 1 is formed with sputtering method, in order to enhance high orientation or phase separation of the first phase A consisting of crystal phase, film formation is preferable to be carried out under application of bias to the substrate. The substrate bias is preferable to be 300 W or less. According to such a bias sputtering, a phase separated structure can be easily obtained during film formation. Further, the film obtained by sputtering can be heat treated at temperature of approximately 200 to 300° C. to enhance precipitation of the second phase B.

Further, considering morphology or orientation of the soft magnetic alloy film 1, film formation under low Ar pressure is preferable. As a method for forming film under such a low Ar pressure, ion beam sputtering or differential exhaust type collimation sputtering and the like can be cited. In particular, from the view-point of orientation, target and substrate are preferable to be disposed, under low Ar pressure, with sufficiently large distance.

Figure 3:
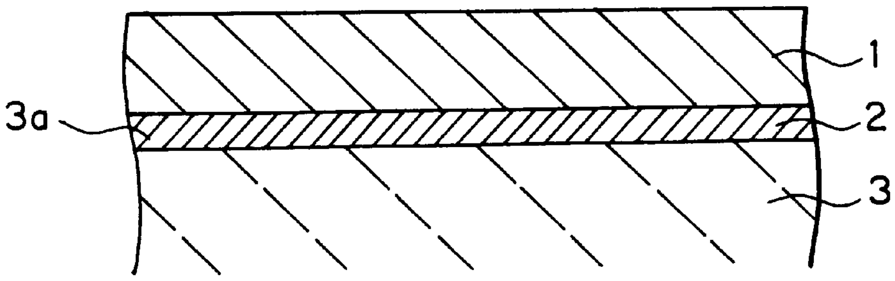
FIG. 3 is a sectional view showing a structure where a film of seed layer is applied in soft magnetic alloy film of the present invention.

The soft magnetic alloy film 1, by forming on an seed layer 2 as shown in FIG. 3, can enhance crystal orientation of the first phase A or the second phase B. For the seed layer 2, for instance, a crystal phase having body-centered cubic structure which is oriented with priority in (110) plane, a crystal phase having face-centered cubic structure which is oriented with priority in (111) plane, a crystal phase having hexagonal closest packed structure which is oriented with priority in (001) plane, or mixture thereof can be applied. For instance, Fe—Co phase which has body-centered cubic structure tends to orient with priority on the seed layer 2 having (110) plane. In the same manner, Fe—Co phase having face-centered cubic structure tends to orient with priority on the seed layer 2 having (111) plane.

Incidentally, state in which the seed layer 2 is oriented with priority can be evaluated with X-ray diffraction or electron diffraction as aforementioned. Here, the full-width at half maximum of the rocking curve of each crystal plane is preferable to be 10 degree or less, further preferable to be 5 degree or less.

As representative examples of the seed layer 2, single film of metal such as Cu, Au, Pd, Ir, Al, Fe, Cr, Ag, Pt, Ti, Ta, W, V, Hf, Zr, Nb, Ni, Rh, Ru, Mn, Mo, or an alloy film containing at least one kind thereof can be cited. As alloy film, for instance, $Ni_X Fe_{100-X}$, $Cu_X Au_{100-X}$ and the like can be employed.

The film thickness of the seed layer 2 is preferable to be 5 nm or more. When the film thickness of the seed layer 2 is under 5 nm, completely crystalline film can be formed with difficulty due to surface roughness of the substrate 3, the aforementioned plane of orientation is less likely to be obtained. To sufficiently orient the seed layer 2, its film thickness thereof is preferable to be 5 nm or more, further preferable to be 10 nm or more. However, the seed layer 2 of too much thickness is likely to cause too much grain growth, resulting in growth of average grain diameter of the soft magnetic alloy film 1 formed thereon. Therefore, the film thickness of the seed layer 2 is preferable to be 100 nm or less.

Next, with reference to FIG. 1B, embodiments of another soft magnetic alloy film of the present invention will be described.

A soft magnetic alloy film 2 shown in FIG. 1B has a composition essentially consisting of general formula: $Fe_{1-a-b}Co_aNi_b$ (in the formula, a and b satisfy $0 \leqq a<1$, $0 \leqq b<1$, $0 \leqq a+b<1$)

A soft magnetic alloy film 2 satisfying such a composition has a first phase C consisting of body-centered cubic structure of which main component is Fe, Fe—Co or Fe—Co—Ni, and a second phase D consisting of face-centered cubic structure of which main component is Fe, Fe—Co or Fe—Co—Ni, and average grain diameter of the first phase C is larger than that of the second phase D, and the first phase C occupies 50% or more of the film texture. For main component of soft magnetic alloy film 2, as identical as the case of the soft magnetic alloy film 1, as a composition range obtainable a particularly high saturation magnetization, the value of 1−a−b in equation (2) is preferable to be in the range of composition of $0.6<1-a-b<0.95$ where Fe is rich.

Further, by making the first phase C and the second phase D coexisting, excessive growth of the grains of the first phase C can be suppressed. Further, the second phase D consisting of face-centered cubic structure enhances lower coercive force. The average grain diameter of the first phase C is made larger than that of the second phase D, and the first phase C is made to occupy 50% or more of the film texture. Thereby, saturation magnetization higher than Fe of the first phase C of body-centered cubic structure is not damaged.

Further, to possession of large plus magneto-striction of the first phase C of body-centered cubic structure, the second phase D of face-centered cubic structure, through adjustment of its composition, can be made to have large minus magneto-striction, at least magneto-striction of the second phase D is smaller than that of the first phase C. Therefore, existence of the second phase D has an effect of reducing saturation magneto-striction of the whole film.

Here, (110) plane of the first phase C preferable to be grown in parallel with respect to the film plane. This, as identical as the case of the aforementioned soft magnetic alloy film 1, reduces influence of magneto-striction. Further, in the second phase D which enhances soft magnetic characteristic of the whole film, the (111) plane thereof is desirable to be grown in parallel with respect to the film plane.

In this case, a state where (110) plane of the first phase C is grown in parallel with film plane, or a state where (111) plane of the second phase D is grown in parallel with film plane is analyzed in its structure through rocking curve measurement in X-ray diffraction or observation of cross-section of the film due to an electron microscope. The full width at half maximum of the rocking curve in (110) peak of the first phase C of body-centered cubic structure is preferable to be 10 degree or less, more preferable to be 5 degree or less. Further, according to the other analysis, it is preferable that, spots due to (110) plane of diffraction pattern through observation of the cross-section of the film with an electron microscope exist, and the width of its breadth has an angle of, with respect to the direct spot, 13 degree or less, more preferably to have that of 7 degree or less.

Further, the grain diameter of the first phase C is in the range of 50 nm or less, the grain diameter of the second phase D is in the range of 15 nm or less. When the second phase D has the grain diameter of 15 nm or more, an effect of suppressing too much grain growth becomes small. In addition, when the first phase C has grain diameter of 50 nm or more, due to its magnetocrystalline anisotropy, soft magnetic characteristic is deteriorated.

Next, an embodiment of a third soft magnetic alloy film of the present invention will be described. A third soft magnetic alloy film of the present invention has a composition essentially consisting of general formula: $Fe_{1-a-b}Co_aNi_b$ (3)

(in the formula, a and b satisfy $0 \leqq a<1$, $0 \leqq b<1$, $0 \leqq a+b<1$), wherein the film as a whole is consisted of a phase having body-centered cubic structure of which main component is Fe, Fe—Co or Fe—Co—Ni, and grain diameter is in the range of 50 nm or less, and (110) plane is grown in parallel with respect to the film plane of the soft magnetic alloy film.

Through making possessing body-centered cubic structure as a whole film, saturation magnetization higher than that of Fe can be maintained. For this, the range of Fe composition thereof is desirable to be $0.3 \leqq 1-a-b \leqq 0.95$. Further, the grain diameters of all the grains of the soft magnetic alloy film is in the range of 50 nm or less. When there are grains of grain diameter larger than this range, soft magnetic characteristic is deteriorated. Further, through growth of (110) plane in parallel with the film plane, soft magnetic characteristic of further excellence can be obtained.

In this time, a state where (110) plane of a phase of body-centered cubic structure is grown in parallel with the film plane can be analyzed of it structure by rocking curve measurement in X-ray diffraction or by observation of the cross-section due to electron microscope. The full width at half maximum in the rocking curve at (110) peak of the phase of body-centered cubic structure is preferable to be 10 degree or less, more preferable to be 5 degree or less.

Further, according to the other analysis, it is preferable that, spots due to (110) plane of diffraction pattern through observation of the cross-section of the film with an electron microscope exist, and the width of its breadth has an angle of, with respect to the direct spot, 13 degree or less, more preferably to have that of 7 degree or less.

As; a method for forming the aforementioned soft magnetic alloy films of respective embodiments, sputtering under low gas pressure or bias sputtering is preferable. In particularly, employment of collimation sputtering method or differential exhaust type sputtering device is preferable.

Next, embodiments of manufacturing method of the soft magnetic films of the present invention will be described.

In the manufacturing method of a soft magnetic film of the present invention, soft magnetic film of which main component is Fe, Fe—Co or Fe—Co—Ni is formed by sputtering method in gas atmosphere of which plasma discharge pressure is 1.0 mTorr or less. That is, it is formed in a gas atmosphere of which mean free path is 3.0 mm or more. Here, the gas atmosphere of which mean free path is 3.0 mm or more can be obtained by setting gas pressure according to the kind of gas. The mean free path λ (cm) can be obtained from gas pressure with the following equation.

Equation: $\lambda=\lambda_0\cdot(T/273)\cdot 1/P$

In this equation, P denotes gas pressure (Torr), T denotes temperature (K). $\lambda_0$ is the mean free path at 0° C. and 1 Torr, and is determined according to the kind of gas. In Table 1, values of $\lambda_0$ are shown according to the kinds of gases. Further, if temperature is around room temperature, λ can be approximated by $\lambda=\lambda_0/P$.

TABLE 1

| Kind of gas | $\lambda_0$ ($\times 10^{-3}$ cm) |
|---|---|
| Ar | 4.47 |
| Kr | 3.45 |
| Xe | 2.25 |
| $H_2$ | 8.01 |
| $O_2$ | 4.57 |
| $N_2$ | 4.10 |

In the gas atmosphere of which mean free path is 3.0 mm or more, the gas pressure is suppressed lower compared with that of during ordinary film formation. For instance, when a soft magnetic film is formed with sputtering method, by setting the mean free path of the sputtering gas at 3.0 mm or more, crystal orientation of the soft magnetic film of which main component is Fe, Fe—Co or Fe—Co—Ni is remarkably enhanced. In specific, when the soft magnetic film is Fe or Fe—Co alloy phase of body-centered cubic structure, (110) plane can be oriented with priority. When the soft magnetic film is Fe phase or Fe—Co—Ni alloy phase of face-centered cubic structure, (111) plane can be oriented with priority.

When a soft magnetic film has face-centered cubic structure, since the face-centered cubic structure is inherently small in saturation magnetostriction, by further orienting with priority in (111) plane, soft magnetic properties can be further enhanced. When a soft magnetic film has body-centered cubic structure, by orienting in (110) plane with priority as described above, (110) plane magnetostriction can be suppressed small. Therefore, influence of magnetostriction and film stress on in-plane L magnetization rotation becomes small. Therewith, soft magnetic properties of magnetic film can be improved.

Further, when sputtering gas pressure has mean free H path of below 3.0 mm, orientation of the soft magnetic film deteriorates and, at the same time, oxygen content in the film increases, further corrosion-resistance deteriorates due to deterioration of the film quality. The oxygen contained in the film, by reacting with Fe phase or Fe—Co alloy phase through heat treatment and the like, precipitates, forms oxide in grains or at grain boundary. The oxide precipitated in the grains or at the grain boundaries become pinning sites of magnetization rotation, cause increase of coercive force, resulting in causing deterioration of the soft magnetic properties.

Figure 4:
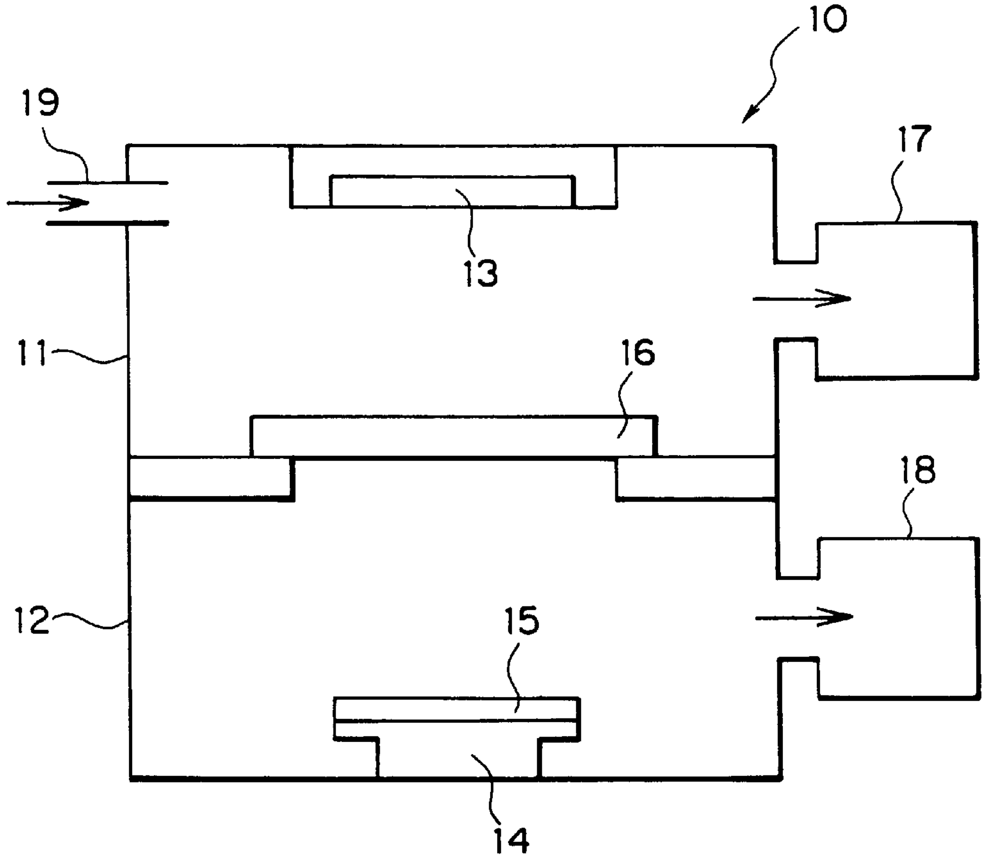
FIG. 4 is a diagram showing one example of a sputtering apparatus which is employed in a manufacturing method of a soft magnetic film of the present invention.

In FIG. 4, an example of a constitution of a sputtering device which is effective upon application of manufacturing method of the soft magnetic film of the present invention is shown. The sputtering device 10 shown in FIG. 4 comprises a sputtering room 11 and a deposition room 12. The sputtering room 11 is provided with a target 13. The deposition room 12 is provided with a substrate holder 14 so as to oppose to the target 13 in the sputtering room 11, a substrate 15 is held at this substrate holder 14

Figure 5:
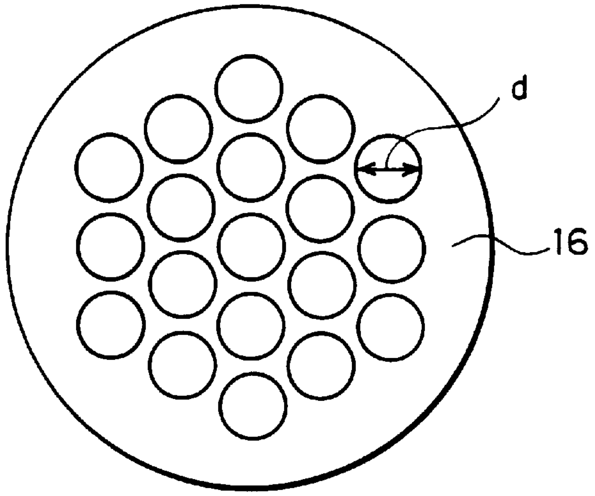
FIG. 5 is a diagram showing one example of a collimator of the sputtering apparatus shown in FIG. 4.

Between the sputtering room 11 and the deposition room 12, such a collimator 16 as shown in, for instance, FIG. 5 is disposed. Further, to the sputtering room 11 and the deposition room 12, exhaust pumps 17, 18 are connected, respectively, thereby the atmospheric pressure of respective rooms 11, 12 are made possible to be set independently. References numeral 19 in the figure is an inlet of processing gas.

In such a sputtering device, the gas pressures in the sputtering room 11 and the deposition room 12 (in particular in the sputtering room 11) are set to be 3.0 mm or more of their mean free path. By sputtering a soft magnetic film of which main component is Fe or Fe—Co in such a gas atmosphere, a soft magnetic film excellent in orientation property can be obtained.

Further, by disposing a collimator 16 between the sputtering room 11 and the deposition room 12, only sputtering particles high in directivity are piled up. Thereby, orientation property of soft magnetic film can be further heightened. When the collimator 16 is employed, collision of recoil particles on the substrate 15 can be suppressed, resulting in suppression of damage of the film. The diameter d of opening of a collimator 16 is determined considering degree of necessity of directivity, pile speed of film and the like. In addition, by applying a differential exhaust type sputtering which makes use of pressure difference of the sputtering room 11 and the depositing room 12, sputtering particles of more strong directivity are piled. Therefore, the directivity of the soft magnetic film can be further heightened.

Thus, when soft magnetic film of which main component is Fe, Fe—Co or Fe—Co—Ni is formed by sputtering in a gas atmosphere of which mean free path is 3.0 mm or more, by applying collimation sputtering or differential exhaust type sputtering, priority orientation of the soft magnetic film can be further enhanced. Therefore, soft magnetic properties of the soft magnetic film can be further enhanced.

When magnetic pole of a magnetic head is formed by burying a soft magnetic film in a trench, the manufacturing method of the soft magnetic film of the present invention is particularly effective. That is, by forming film in a low pressure sputtering gas, further by combining collimation sputtering or differential exhaust type sputtering, sputtering particles only of more high directivity are selectively piled. Therefore, grain growth from the side wall of the trench can be suppressed, magnetic pole consisting of soft magnetic film of excellent orientation property and crystallinity can be obtained.

The manufacturing method of the soft magnetic film of the present invention is effective when the aforementioned soft magnetic alloy film of the present invention is produced. That is, when, as shown in FIG. 1A, soft magnetic alloy film 1 having the first phase A and the second phase B is produced, by applying the manufacturing method of the present invention, crystal orientation of, for instance, the first phase A can be heightened. When the second phase B is composed of crystal phase, its orientation tendency can be also enhanced. Thus, by enhancing crystal orientation of the first phase A and the second phase B, soft magnetic properties of the soft magnetic alloy film 1 can be further improved.

Next, embodiment of a magnetic head of the present m invention will be described.

Figure 6:
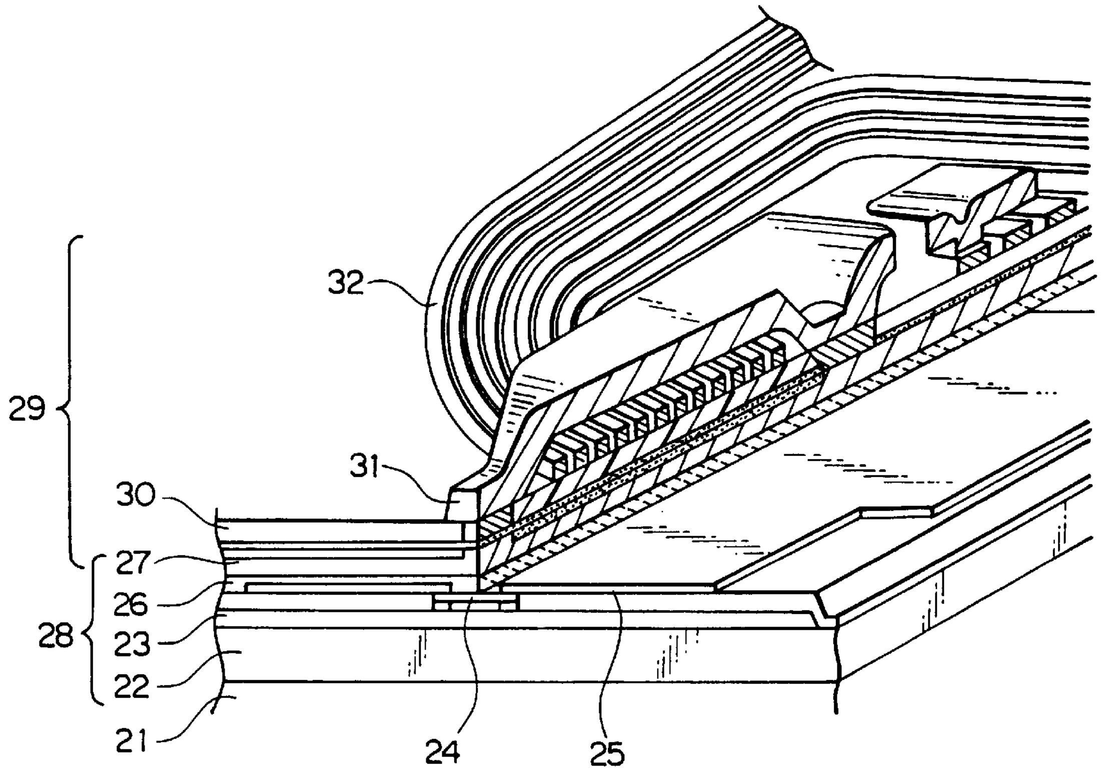
FIG. 6 is a diagram showing, by partly cutting, one constitutional example of a magnetic recording/reproducing separation head in which a magnetic head of the present invention is employed as a recording head.

FIG. 6 is a diagram showing, by partly cutting, a constitution of an essential portion of one embodiment of a magnetic recording/reproducing separation head in which a magnetic: head of the present invention is employed. In the same figure, reference numeral 21 is a substrate, for instance an $Al_2O_3$.TiC substrate having $Al_2O_3$ layer can be used for the substrate 21. On the substrate 21, a lower side magnetic shield layer 22 is formed of soft magnetic material such as NiFe alloy or amorphous CoZrNb alloy of a thickness of approximately 1 to 2 $\mu$m.

On the lower side magnetic shield layer 22, through a lower side reproducing magnetic gap 23 of a thickness of approximately 150 nm and consisting of non-magnetic insulating material such as $AlO_x$ and the like, a magneto-resistance effect film (MR film) 24 is formed. For the MR film 24, an anisotropic magneto-resistance effect (AMR) film showing AMR such as permalloy alloy film, or a giant magneto-resistance effect (GMR) film showing GMR such as artificial lattice film, spin valve film, ferromagnetic tunnel junction film can be employed. At both edge portions of the MR film 24, lead electrodes 25 feeding sense current to the MR film 24 are connected respectively. These MR film 24 and lead electrode 25 constitute reproducing element portion.

On the MR film 24 and the lead electrode 25, through an upper side reproducing magnetic gap 26 consisting of non-magnetic insulating material identical with the lower side reproducing magnetic gap film 23, an upper side magnetic shield layer 27 is formed. The upper side magnetic shield layer 27 is composed of a soft magnetic material identical with the lower side magnetic shield layer 22. With these respective constituent elements, a shield type MR head 28 as a reproducing head is constituted.

On the shield type MR head 21, a thin film magnetic head 29 is formed as a recording head. A lower magnetic pole of the thin film magnetic head 29 is constituted of a magnetic layer identical with the upper side magnetic shield layer 27,. That is, the upper side magnetic shield layer 27 of the shield type MR head 28 concurrently serves as the lower recording magnetic pole of the thin film magnetic head 29. On the lower recording magnetic pole 27 concurrently serving as the upper side magnetic shield layer, a recording magnetic gap 30 consisting of a non-magnetic insulating material such as $AlO_x$ is formed.

On the recording magnetic gap 30, an upper recording magnetic pole 31 is disposed. On the side behind the air bearing surface, a coil 32 consisting of Cu and the like is formed at: the lower side of the upper recording magnetic pole 31. That is, between the upper recording magnetic pole 31 and the lower recording magnetic pole 27, a coil 32 is disposed The coil 32 is buried in an insulating layer of polyimide and the like which are omitted in the figure. With these respective constituent elements, a main portion of a thin film magnetic head 29 as a recording head is constituted.

Figure 7:
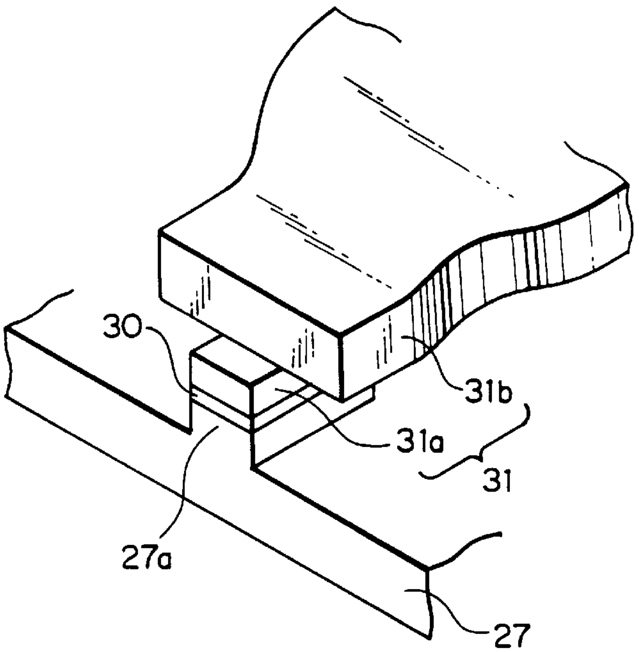
FIG. 7 is a diagram showing essential portion of one constitutional example of a recording head portion of a magnetic recording/reproducing separation head shown in FIG. 6.
Figure 8:
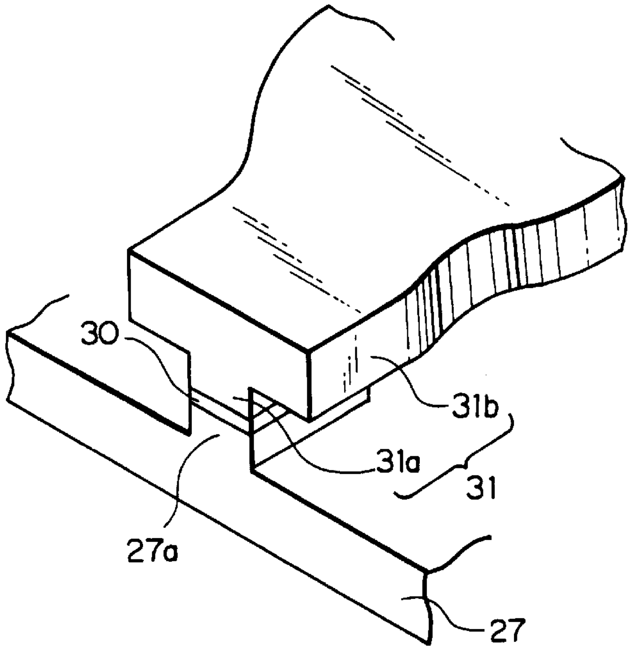
FIG. 8 is a diagram showing essential portion of another constitutional example of a recording head portion of a magnetic recording/reproducing separation head shown in FIG. 6.

The upper recording magnetic pole 31, as shown in FIG. 7 and FIG. 8, has a magnetic pole tip 31*a* contacting with a L recording magnetic gap 30, and a auxiliary magnetic pole 31*b* which is connected with this magnetic pole tip 31*a* and is broader than that. In the magnetic pole structure shown in L FIG. 7, the auxiliary magnetic pole 31*b* is separated from the magnetic pole tip 31*a*. As shown in FIG. 8, the auxiliary magnetic pole 31*b* can be formed integrated with the magnetic pole tip 31*a*. The lower recording magnetic pole 27 has a magnetic pole tip 27*a* contacting in the same manner with a recording magnetic gap 30. These magnetic pole tips 27*a*, 31*a* are disposed oppositely through the recording magnetic gap 30.

Figure 9:
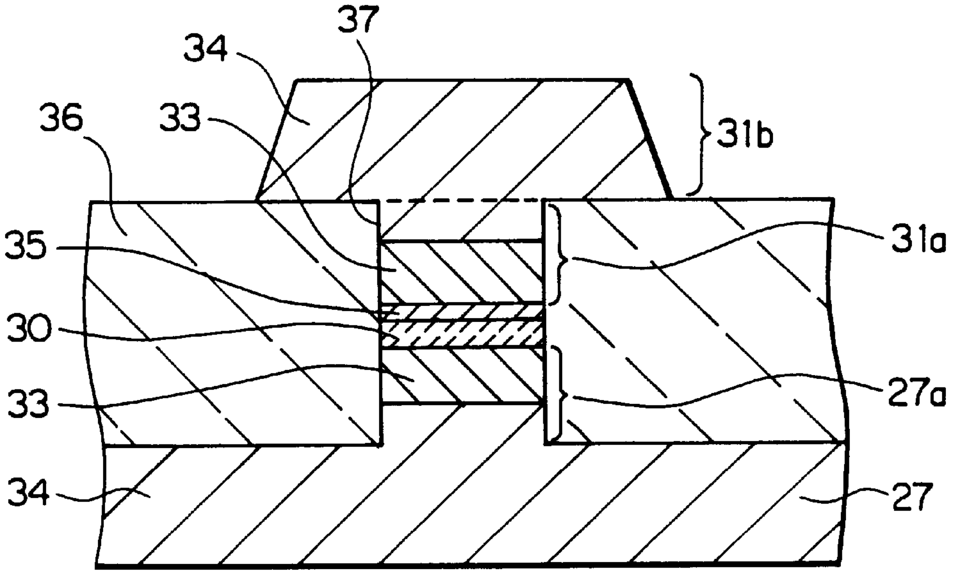
FIG. 9 is a sectional view showing an essential portion of a magnetic pole structure according to one embodiment of a magnetic head of the present invention in which the magnetic head is applied in a magnetic recording/reproducing separation head shown in FIG. 6.
Figure 10:
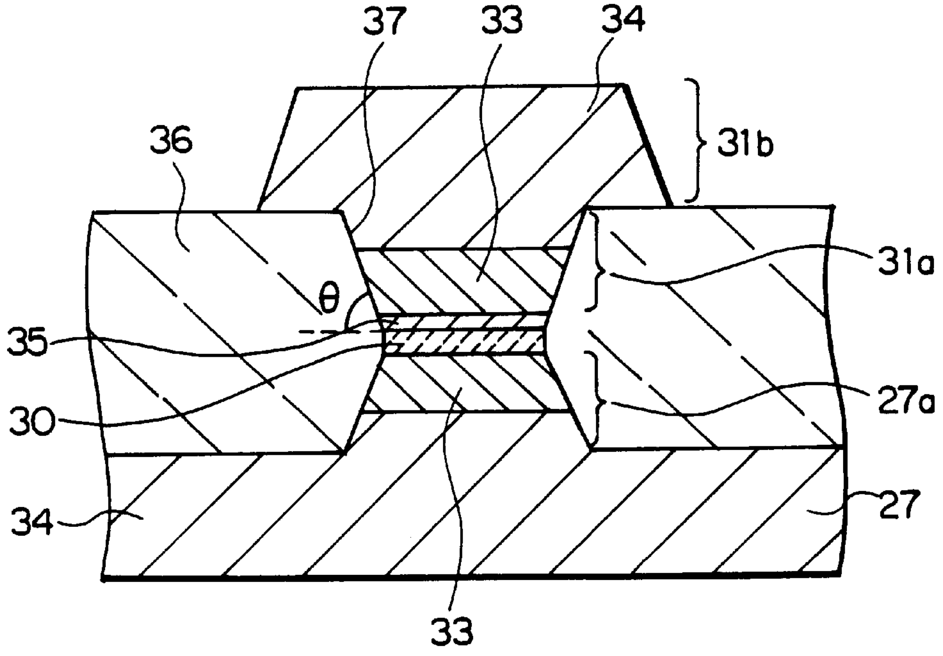
FIG. 10 is a sectional view showing one modified example of an essential portion of a magnetic pole structure of a magnetic head shown in FIG. 9.
Figure 11:
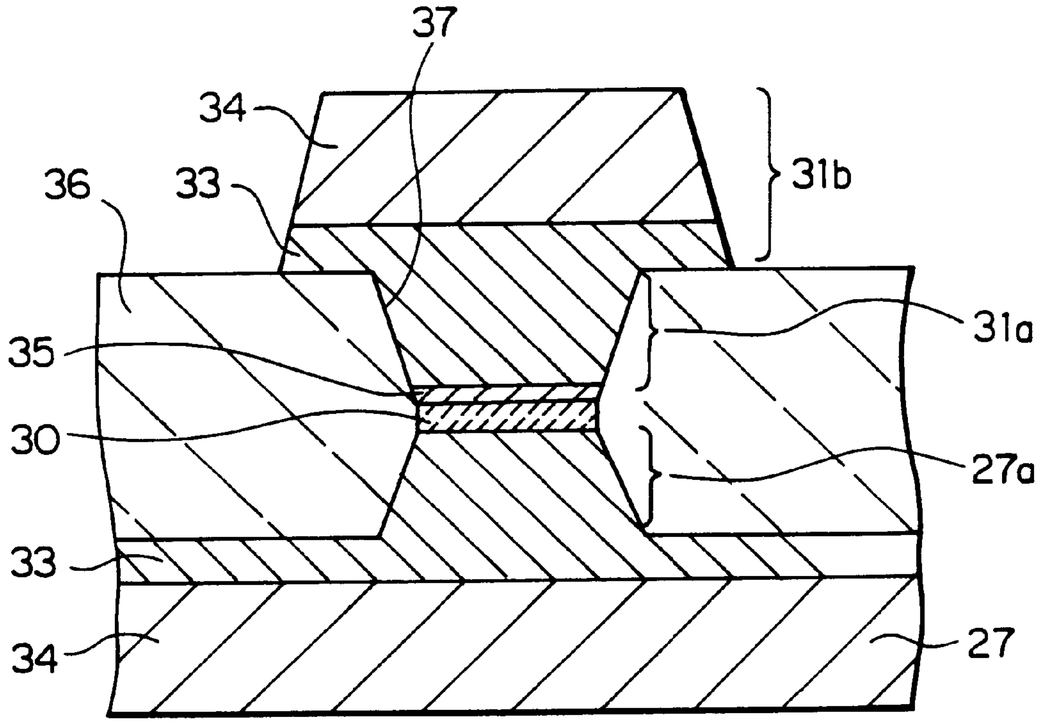
FIG. 11 is a sectional view showing another modified example of an essential portion of a magnetic pole structure of a magnetic head shown in FIG. 9.

In a thin film magnetic head 29 which functions as recording head of the aforementioned magnetic recording/reproducing separation head, all portions adjacent to the air bearing surface of the lower recording magnetic pole 27 and the upper recording magnetic pole 31, as shown in FIG. 9, FIG. 10, FIG. 11, have a laminate film of the first magnetic layer 33 and the second magnetic layer 34.

The first magnetic layer 33 is composed of a soft magnetic alloy film of the present invention of which composition is expressed by the aforementioned equation (1), and which has the first phase A and the second phase B as fine structure. The second magnetic layer 34 is composed of a soft magnetic film of saturation magnetic flux density $Bs_2$ which is smaller than saturation magnetic flux density $Bs_1$ of the first magnetic layer 33 ($Bs_2<Bs_1$). For the second magnetic layer 34, permalloy ($Ni_{80}Fe_{20}$ and the like), amorphous CoFeZr alloy, Sendust and the like of relatively low saturation magnetic flux density can be employed.

Incidentally, at the portion of the upper recording magnetic pole 31 which contacts with the recording magnetic gap 30, the third, very thin magnetic layer 35 may be disposed. For the third magnetic layer 35, as identical as the second magnetic layer 34, soft magnetic film of relatively low saturation magnetic flux density can be employed.

In the magnetic pole structure shown in FIG. 9, the first magnetic layer 33 of high Bs constitutes a part of respective magnetic pole tips 27*a*, 31*a* of the lower recording magnetic pole 27 and the upper recording magnetic pole 31. In the upper recording magnetic pole 31, the second magnetic layer 34 of low Bs constitutes the remaining portion of the magnetic pole tip end 31*a* and the auxiliary magnetic pole 31*b*. In the lower recording magnetic pole 27, the second magnetic layer 34 of low Bs constitutes the remaining portion of the magnetic pole tip 27*a* and the magnetic pole body 27. Such a magnetic pole structure can be applicable for either of a separation type magnetic pole shown in FIG. 7 and an integration type magnetic pole shown in FIG. 8.

The magnetic pole structure shown in FIG. 9 can be formed, for instance, in the following manner. First, a lower recording magnetic pole 27 consisting of a laminate film of the second magnetic layer 34 and the first magnetic layer 33 is formed. The lower recording magnetic pole 27 has a magnetic pole tip 27*a* formed by ordinary PEP (photo-engravement process) and the like.

Next, on the lower recording magnetic pole 27, an insulating layer 36 consisting of $SiO_x$ and the like is formed, a trench 37 is formed in this insulating layer 36. The shape of the trench 37, as shown in FIG. 10, can be one of which side wall is inclined with angle of θ.

Thereafter, inside the trench 37 formed in the insulating layer 36, high Bs material (the first magnetic layer 33) and low Bs material (the second magnetic layer 34) are embedded in turn to form the magnetic pole tip 31*a*. Thereon the auxiliary magnetic pole 31*b* consisting of the second magnetic layer 34 is formed.

As shown in FIG. 11, the first magnetic layer 33 in the upper recording magnetic pole 31 can be formed such that it constitutes the magnetic pole tip 31*a* and a part of the neighboring auxiliary magnetic pole 31*b*. Same with the lower recording magnetic pole 27, the magnetic pole tip 27*a* and a part of the magnetic pole body 27 neighboring thereto can be constituted by the first magnetic layer 33.

As aforementioned, in the thin film magnetic head of the present invention, a soft magnetic alloy film of the present invention (the first magnetic layer 33) of high saturation magnetic flux density and excellent soft magnetic properties is disposed on the recording magnetic gap 30 side. Therefore, when recording current is increased, magnetic saturation of the magnetic pole tips 27*a*, 31*a* can be suppressed. Thereby, excellent recording magnetic field intensity and magnetic field gradient can be obtained. Further, overwrite property can be remarkably improved.

Incidentally, in FIG. 7 to FIG. 11, a magnetic pole structure in which, for both the lower and the upper recording magnetic poles 27, 31, convex magnetic pole tips are formed, is described, but the magnetic pole tip end may be formed only for either one of magnetic poles. Further, soft magnetic alloy film of the present invention may be employed only for either one of the lower and the upper recording magnetic poles 27, 31. Further, the magnetic pole can be produced with only the soft magnetic alloy film of the present invention.

Figure 12:
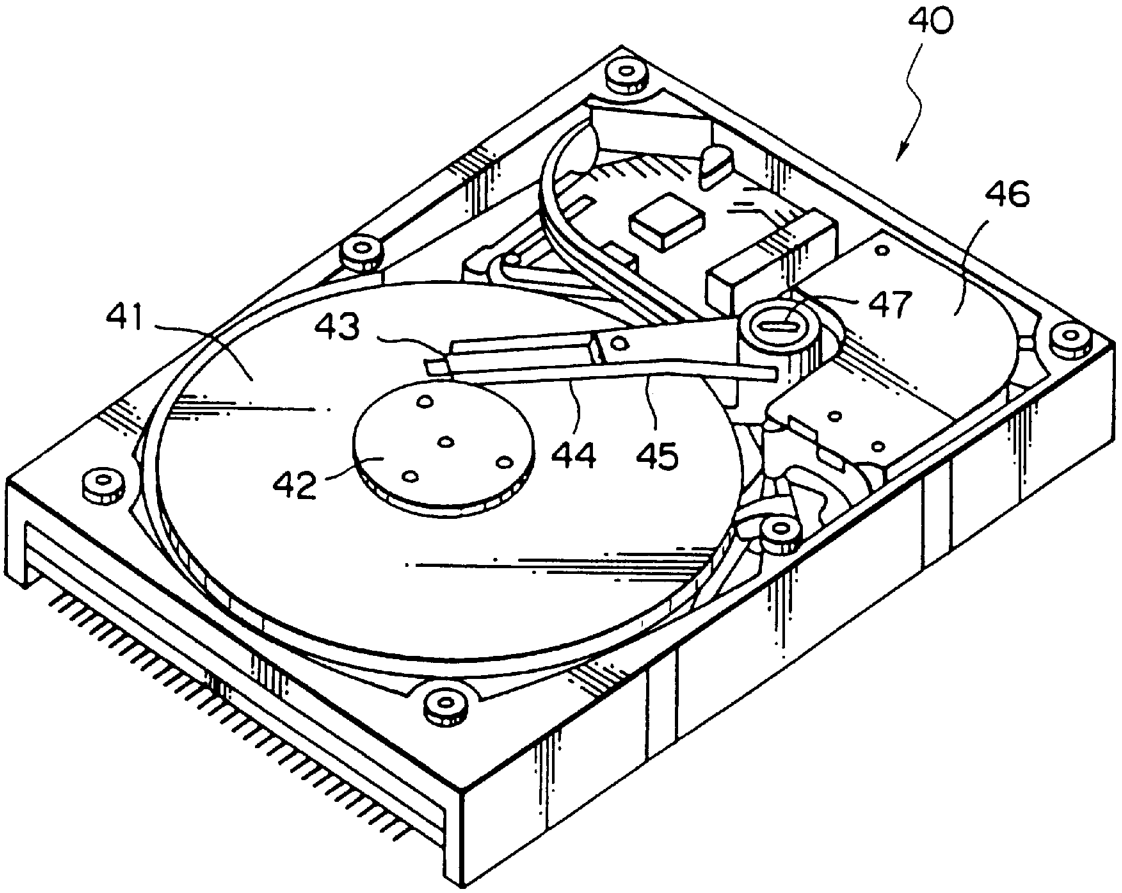
FIG. 12 is a perspective view showing one constitutional example of a magnetic disc drive on which a magnetic recording/reproducing separation head shown in FIG. 6 is mounted.

The aforementioned magnetic recording/reproducing separation head as a magnetic recording/reproducing head is assembled in a head slider. A head slider provided with a magnetic recording/reproducing head is mounted on a magnetic recording device such as a magnetic disc drive shown in, for instance, FIG. 12 and the like. FIG. 12 shows diagrammatically a structure of a magnetic disc drive 40 in which a rotary actuator is employed.

A magnetic disc 41 is inserted in a spindle 42, and is made to rotate by a motor (not shown in the figure) which responds to control signal from a drive controller (not shown in the figure). A head slider 43 carrying out recording/reproducing of information in floated state above the magnetic disc drive 41 is attached to a tip end of a suspension 44 of thin film.

When the magnetic disc 41 rotates, an air bearing surface (ABS) of the head slider 43 is held with a predetermined floating amount d (0 or more, 100 nm or less) m from a surface of the magnetic disc 41. The head slider 43 comprises a magnetic recording/reproducing separation head of the aforementioned embodiment.

The suspension 44 is connected to one end of an actuator arm 45 having a bobbin portion which holds a not shown drive coil. To the other end of the actuator arm 45, a voice coil motor 46, one kind of linear motor, is disposed. The voice coil motor 46 is constituted of a not shown drive coil which is wound up to the bobbin portion of the actuator arm 45, and a magnetic circuitry consisting of a permanent magnet and a yoke which are disposed with an opposite relation with respect to the permanent magnet so as to sandwich the drive coil.

The actuator arm 45 is held by not shown ball bearings disposed at 2 places of above and below a fixed axis 47, and is capable of freely rotating/sliding with the voice coil motor 46.

Next, specific embodiments of the present invention and evaluated results thereof will be described.

Embodiment 1

First, an Fe—Co alloy target of composition of $Fe_{80}Co_{20}$ is prepared by vacuum-arc melting. On this Fe—Co alloy target, an R chip (10×10 mm) is placed, therewith an Fe—Co—R alloy thin film is formed by RFC magnetron sputtering. The size of the Fe—Co alloy target was 5 inches. The ratio of area of the R chip to erosion area of the Fe—Co alloy target was approximately 2%.

Ar gas pressure during sputtering was 3.0 mTorr, back pressure before filming was $1.0\times10^{-6}$ Torr. When considered morphology of the film, Ar pressure during sputtering is desirable to be 0.5 mTorr or more. In order to enhance micro-crystallization and phase separation of the film, the film was formed under application of bias to the substrate. The substrate bias was 300 W or less.

As substrates to be filmed thereon, glass substrate (Corning #0211) and Si(100) substrate were used, and, during filming, substrate holder of the filming device was water cooled. To respective alloy films, after filming, heat treatment was carried out under the following condition. First, in rotating magnetic field, it was held at 300° C. for 1 hour, and, after being held further in a fixed magnetic field for 5 min., left to cool in the furnace. The heat treatment temperature was determined in view of heat treatment step in the manufacturing process of thin film magnetic head.

With the alloy film formed on a glass substrate, coercive force and saturation magnetostriction were measured. Saturation magnetostriction was measured with optical lever method. Further, with the alloy films formed on the Si (100) substrate, crystal structure was determined with X-ray diffraction and transmission electron microscope (TEM) observation. Further, film compositions were determined with ICP analysis method and X-ray fluorescence spectroscopy method.

In Table 2, evaluated results of film compositions of when various kinds of rare earth elements are used as the R chip and coercive forces. Incidentally, comparative example 1 in the Table 2 is a magnetic film formed employing only Fe—Co alloy target.

TABLE 2

| | | Film composition (at %) | Coercive force (Oe) |
|---|---|---|---|
| Comparative example 1 | | $Fe_{80}Co_{20}$ | 45.5 |
| Embodiment 1 | Sample 1 | $Fe_{77.2}Co_{19.3}Sm_{3.5}$ | 4.3 |
| | Sample 2 | $Fe_{78.0}Co_{19.5}Y_{2.5}$ | 5.9 |
| | Sample 3 | $Fe_{77.3}Co_{19.3}Ce_{3.4}$ | 4.2 |
| | Sample 4 | $Fe_{76.2}Co_{19.0}Pr_{4.8}$ | 3.8 |
| | Sample 5 | $Fe_{76.4}Co_{19.1}Nd_{4.5}$ | 4.9 |
| | Sample 6 | $Fe_{77.9}Co_{19.5}Eu_{2.6}$ | 3.0 |
| | Sample 7 | $Fe_{77.8}Co_{19.4}Gd_{2.8}$ | 3.0 |

From results of structural analysis with X-ray diffraction and TEM observation, the sample of comparative example 1 was consisted of only body-centered cubic structure, average grain diameter was approximately 60 nm, full-width at half maximum of (110) rocking curve due to X-ray diffraction was approximately 6.0 degree. Whereas, respective samples of embodiment 1 were confirmed to be constituted of a mixed phase between a crystal phase having body-centered cubic structure of average grain diameter of approximately 20 nm or less, and an amorphous phase of average grain diameter of 2.0 nm or less.

Here, in TEM observation, when observed in dark field with objective iris, amorphous phase was confirmed. In addition, even with high resolution observation (400,000 times or more), the amorphous phase was confirmed. In respective samples of embodiment 1, all the full-width at half maximum of (110) rocking curve of X-ray diffraction was 5.0 degree or less.

Incidentally, in the aforementioned embodiment 1, rare earth elements were added by chip method, but, the identical results were obtained for the cases where Fe—Co—R alloy targets of predetermined compositions were employed. Further, a target to be employed was better when oxygen content thereof was low, melting method is preferable as target formation method. Further, as illustrated in other embodiments which will be described later, by use of a differential exhaust type collimation sputtering device of low Ar pressure, Fe—Co based soft magnetic alloy film of excellent (110) priority orientation, and of more excellent soft magnetic properties can be obtained.

Embodiment 2

As to various kinds of alloy films prepared by employing the identical method as embodiment 1 and by increasing number of chips, relation between added rare earth elements (including Y) and magnetostriction were investigated. The measured results of the magnetostriction were shown in FIG. 13.

Figure 13:
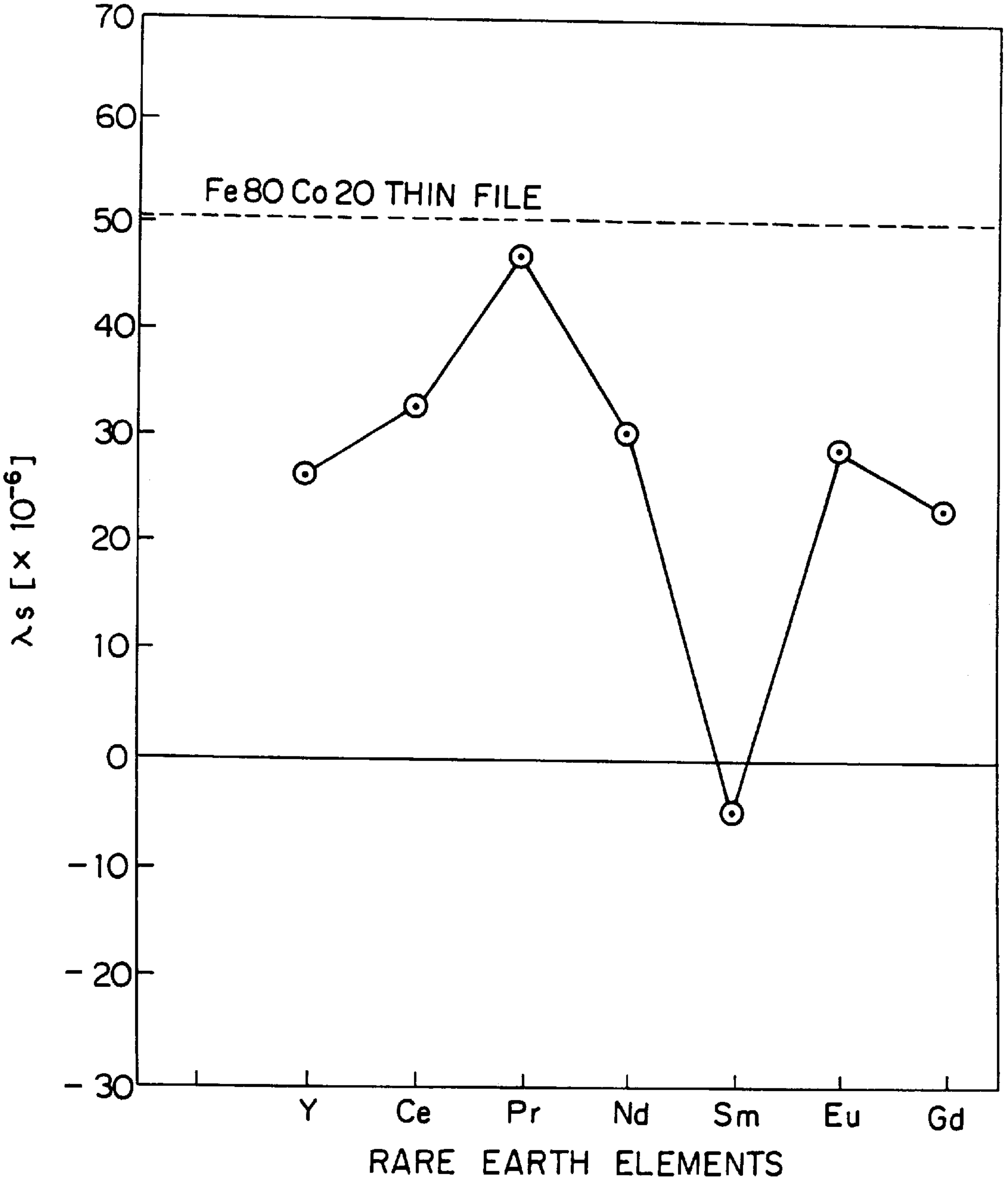
FIG. 13 is a diagram showing relation between rare earth elements added to soft magnetic alloy films according to embodiment 2 of the present invention and saturation magnetostriction.

From FIG. 13, it can be recognized that, when a light rare earth element is added to $Fe_{80}Co_{20}$, magnetostriction lowering effect can be obtained as well as micro-crystallization effect. Among them, magnetostriction lowering effect is particularly large when Sm is added, it is recognized that magnetostriction of $Fe_{80}Co_{20}$ of plus $10^{-5}$ order was lowered to minus $10^{-6}$ order.

Incidentally, all the contents of rare earth elements L of respective samples of embodiment 2 were, according to results of composition analysis due to ICP, 5 at % or more and 10 at % or less.

Embodiment 3

With various alloy targets having compositions of $(Fe_{80}Co_{20})_{100-X}Sm_X$ (at %) (X=0.5, 1.0, 5.0, 10.0, 15.0), with DC magnetron sputtering under the identical condition as embodiment 1, respective Fe—Co-Sm alloy films were formed. As to these alloy films, in the identical manner as embodiment 1, structural analysis and magnetization measurement were carried out. In Table 3, measured results of magnetization are shown.

TABLE 3

| | | Film composition (at %) | Coercive force (Oe) | Bs (T) |
|---|---|---|---|---|
| Embodiment 3 | Sample 1 | $Fe_{79.4}Co_{19.9}Sm_{0.7}$ | 1.8 | 2.3 |
| | Sample 2 | $Fe_{79.1}Co_{19.8}Sm_{1.1}$ | 2.0 | 2.2 |
| | Sample 3 | $Fe_{76.4}Co_{19.1}Sm_{4.5}$ | 5.0 | 2.16 |
| | Sample 4 | $Fe_{72.4}Co_{18.1}Sm_{9.5}$ | 10.0 | 2.0 |
| Comparative example 2 | | $Fe_{68.2}Co_{17.0}Sm_{14.8}$ | 80.3 | 1.7 |

Upon TEM observation of respective samples due to embodiment 3, all samples were confirmed to be constituted of 2 phases of body-centered cubic structure and amorphous phase. On the other hand, sample of comparative example 2 in which Sm content was deviated out of the range of the present invention was found the surface area of the film to be constituted of approximately 50% of amorphous phase. From these, it is found to be effective, for making soft magnetic, to form fine structure of Fe—Co based alloy film of 2 phases. Incidentally, all the average grain diameters of body-centered cubic phases of samples 1 to 4 were 15.0 nm or less.

Next, with respective alloy targets in which 3.0 at % of Sm was added to Fe and FeCo alloy of various compositions, in the identical manner, Fe—Sm alloy film and Fe—Co-Sm alloy films were formed. Incidentally, for substrate, Si (100) substrate having Ti film as seed layer was employed. The film thickness of Ti seed layer was 20 nm. The film thickness of the alloy film was 0.5μm. With these alloy films, as identical as embodiment 1, structural analysis and measurement of magnetization were carried out. In Table 4, measured results of magnetization are shown.

TABLE 4

| | | Film composition (at %) | Coercive force (Oe) | Bs (T) |
|---|---|---|---|---|
| Embodiment 3 | Sample 5 | $Fe_{97.5}Sm_{2.5}$ | 9.5 | 2.0 |
| | Sample 6 | $Fe_{78.0}Co_{19.5}Sm_{2.5}$ | 5.0 | 2.18 |
| | Sample 7 | $Fe_{91.9}Co_{4.8}Sm_{3.3}$ | 6.2 | 2.1 |
| | Sample 8 | $Fe_{86.8}Co_{9.6}Sm_{3.6}$ | 4.9 | 2.14 |
| | Sample 9 | $Fe_{48.3}Co_{48.2}Sm_{3.5}$ | 6.1 | 2.18 |
| | Sample 10 | $Fe_{28.9}Co_{67.4}Sm_{3.7}$ | 5.3 | 2.02 |
| | Sample 11 | $Fe_{9.6}Co_{86.7}Sm_{3.7}$ | 2.1 | 1.7 |

As obvious from Table 4, to Fe and Fe—Co of various kinds of compositions, 2 phases of fine structure are effective to make soft magnetic.

Further, from X-ray diffraction and TEM observation of from sample 5 to sample 11 of embodiment 3, sample 5 to sample 9 were confirmed to be constituted of crystal phase of body-centered cubic structure in which Fe or Fe—Co is main component and amorphous phase. Sample 11 was constituted of crystal phase of face-centered cubic structure and amorphous phase. Sample 10 was constituted of crystal phase having a mixed phase structure of body-centered cubic structure and face-centered cubic structure and amorphous phase.

Incidentally, intensity of halo pattern of amorphous phase in diffraction pattern was remarkably weak, unable accordingly to judge its existence from only X-ray diffraction, but existence of amorphous phase was confirmed by TEM observation.

Embodiment 4

With a differential exhaust type collimation sputtering device shown in FIG. 4, Fe—Co—Sm alloy films of composition of $(Fe—Co)_{95\ to\ 97}Sm_{3\ to\ 5}$ were formed. This sputtering device comprises a sputtering room and a deposition room. The sputtering room and the deposition room are separated by a collimator. Through control of gas flow rate, positions where gas inlet and exhaust pump are attached, Ar pressure of the sputtering room and the deposition room during filming can be controlled freely. The collimator was grounded to earth, and was water cooled.

With such a differential exhaust type collimation sputtering device, first, as seed layer, Ti film (film thickness: 20 nm), Ti film (film thickness : 20 nm)/$Ni_{80}Fe_{20}$ (film thickness : 20 nm), or CuAu alloy film (film thickness 20 nm) were formed. On these seed layers, Fe—Co-Sm alloy films of composition of $(Fe—Co)_{95\ to\ 97}Sm_{3\ to\ 5}$ were formed. In this time, by controlling Ar flow rate, Ar pressure of the deposition room was varied during filming.

Figure 14:
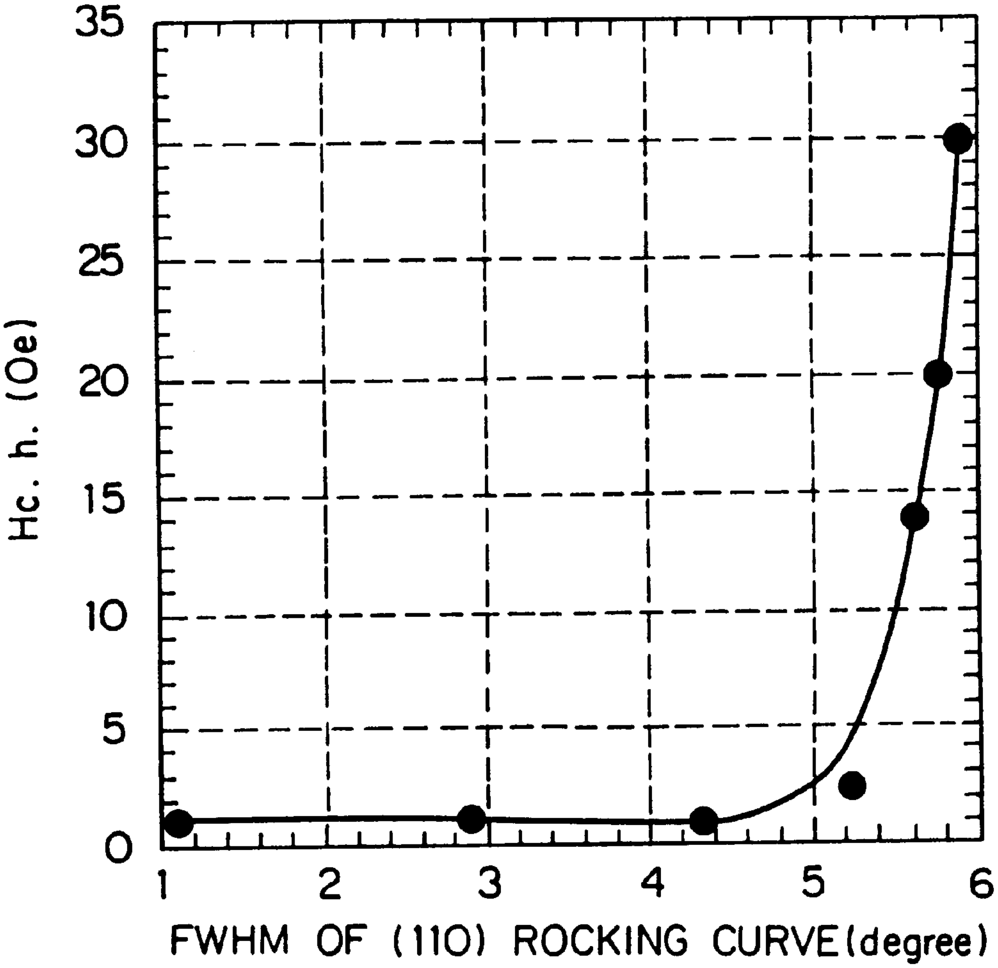
FIG. 14 is a diagram showing relation between full widths at half maximum of (110) rocking curves of FeCo alloy films according to embodiment 4 of the present invention and coercive forces.

Full-width at half maximum (FWHM) of (110) rocking curve and coercive force (Hc) of the obtained respective Fe—Co—Sm alloy films were measured. These results are shown in FIG. 14. As obvious from FIG. 14, it is recognized that, in the Fe—Co-Sm alloy film, the full width at half maximum of (110) rocking curve becomes low coercive force drastically from around 5 degree.

Embodiment 5

With the differential exhaust type collimation sputtering device identical as embodiment 4, Fe film and FeCo alloy films of various kinds of compositions were formed. In this case, Ar pressure of the deposition room during filming was varied in various manner. Of obtained Fe film and FeCo alloy films, composition, (110) degree of orientation based on the full-width at half maximum of (110) rocking curve of body-centered cubic structure, average grain diameter, coercive force, saturation magnetic flux density are shown together in Table 5.

TABLE 5

| | Ar pressure (mTorr) | Film composition (at %) | (110) degree of orientation (degree) | Average grain diameter (nm) | Coercive force (Oe) | Bs (T) |
|---|---|---|---|---|---|---|
| Embodiment 5 | | | | | | |
| Sample 1 | 0.5 | Fe | 3.0 | 20.5 | 3.0 | 2.13 |
| Sample 2 | 0.5 | $Fe_{95}Co_5$ | 2.7 | 19.0 | 3.2 | 2.2 |
| Sample 3 | 0.5 | $Fe_{70}Co_{30}$ | 2.4 | 19.2 | 2.1 | 2.4 |
| Sample 4 | 0.4 | $Fe_{50}Co_{50}$ | 3.4 | 20.5 | 4.3 | 2.3 |
| Sample 5 | 0.3 | $Fe_{30}Co_{70}$ | 3.2 | 21.3 | 3.1 | 2.2 |
| Sample 6 | 0.2 | $Fe_{80}Co_{20}$ | 2.0 | 21.0 | 1.1 | 2.35 |
| Sample 7 | 0.5 | $Fe_{80}Co_{20}$ | 3.5 | 20.4 | 2.0 | 2.33 |
| Comparative example 3 | 2.0 | $Fe_{80}Co_{20}$ | 5.5 | 19.0 | 20.0 | 2.28 |

From Table 5, it is recognized that, by enhancing degree of (110) orientation of Fe film or Fe—Co alloy films, coercive force becomes small. That is, soft magnetic properties of Fe film or FeCo alloy films can be heightened. Further, from the result of structural analysis due to X-ray diffraction, sample 5 was found that body-centered cubic structure and face-centered cubic structure coexisted therein, and, from observation with electron microscope, average grain diameter of a phase of body-centered cubic structure was larger than that of a phase of face-centered cubic structure.

Embodiment 6

With a differential exhaust type collimation sputtering device as identical as embodiment 4, Fe—Co—Ni alloy films and various Fe—Co alloy films are formed. Saturation magnetization and coercive force are measured with VSM. Grain diameter is measured by X-ray diffraction, degree of orientation is evaluated through measurement of rocking curve due to X-ray diffraction. Film composition is measured by ICP method.

TABLE 6

| | Film composition (at %) | Coercive force (Oe) | (110) degree of orientation (degree) | Average grain diameter (nm) | Ar pressure (mTorr) | Bs (T) |
|---|---|---|---|---|---|---|
| Embodiment 6 | | | | | | |
| Sample 1 | $Fe_{60}Co_{15}Ni_{25}$ | 3.0 | 3.0 | 20.5 | 0.5 | 2.25 |
| Sample 2 | $Fe_{80}Co_5Ni_{15}$ | 3.2 | 2.7 | 19.0 | 0.5 | 2.30 |
| Sample 3 | $Fe_{10}Co_{85}Ni_5$ | 2.1 | 2.4 | 19.2 | 0.5 | 2.19 |
| Sample 4 | $Fe_{90}Co_5Sm_3N_2$ | 1.0 | 2.5 | 13.4 | 0.4 | 2.1 |
| Sample 5 | $Fe_{86}Co_5Sm_2Ta_3N_2$ | 0.8 | 3.2 | 12.2 | 0.4 | 2.0 |
| Sample 6 | $Fe_{90}Co_8Ni_2$ | 1.9 | 2.0 | 15.0 | 0.2 | 2.2 |
| Sample 7 | $Fe_{70}Co_{15}Ni_{13}N_2$ | 1.8 | 2.4 | 13.0 | 0.2 | 2.0 |
| Sample 8 | $Fe_{91}Co_6B_3$ | 2.0 | 2.5 | 12.8 | 0.2 | 2.2 |

From the table 6, it is recognized that Fe—Co—Ni alloy, through possession of excellent (110) orientation of the phase of body-centered cubic structure as identical as embodiment 5, even when a phase of body-centered cubic structure occupies 50% or more, coercive force becomes small. That is, also in Fe—Co—Ni alloy as identical as Fe—Co alloy, by investing remarkably excellent (110) orientation, soft magnetic characteristic is improved.

Further, as the result of structural analysis due to X-ray diffraction and observation due to electron microscope, sample 3 is confirmed that it is consisted of a mixed phase of body-centered cubic structure and face-centered cubic structure, and, the phase of body-centered cubic structure is larger in average grain diameter than that of the phase of face-centered cubic structure, and further occupies approximately 70% of the film texture. Sample 1 and sample 2 are confirmed to be constituted only of body-centered cubic structure as a whole.

The other samples are also found to show excellent soft magnetic: characteristic due to excellent (110) orientation.

Embodiment 7

With $Fe_{79.4}Co_{19.9}Sm_{0.7}$ alloy film, which is one of embodiments of the present invention, as a recording magnetic pole material, a magnetic recording/reproducing separation head shown in FIG. 6 was prepared. Respective magnetic heads in which separation type magnetic pole shown in FIG. 7 and integration type magnetic pole shown in FIG. 8 are applied respectively as the upper recording magnetic pole are prepared.

For shape of recording magnetic pole in the neighborhood of air bearing surface, structures shown respectively in FIG. 9, FIG. 10 and FIG. 11 were adopted. All of these respective magnetic poles comprise a laminate film of $Fe_{79.4}Co_{19.9}Sm_{0.7}$ alloy film/$Ni_{80}Co_{20}$ alloy film. For the reproducing element portion, a spin valve GMR element of film structure of Ta/IrMn/CoFe/Cu/CoFe/NiFe/Ta was employed.

In addition, as comparative example of the present invention, a magnetic head having magnetic pole structure consisting of only $Ni_{80}Fe_{20}$ alloy film (comparative example 4), a magnetic head having a magnetic pole structure consisting L of a laminate film of $Ni_{80}Fe_{20}$ alloy film/$Ni_{50}Fe_{50}$ alloy film (comparative example 5) were respectively prepared.

Figure 15:
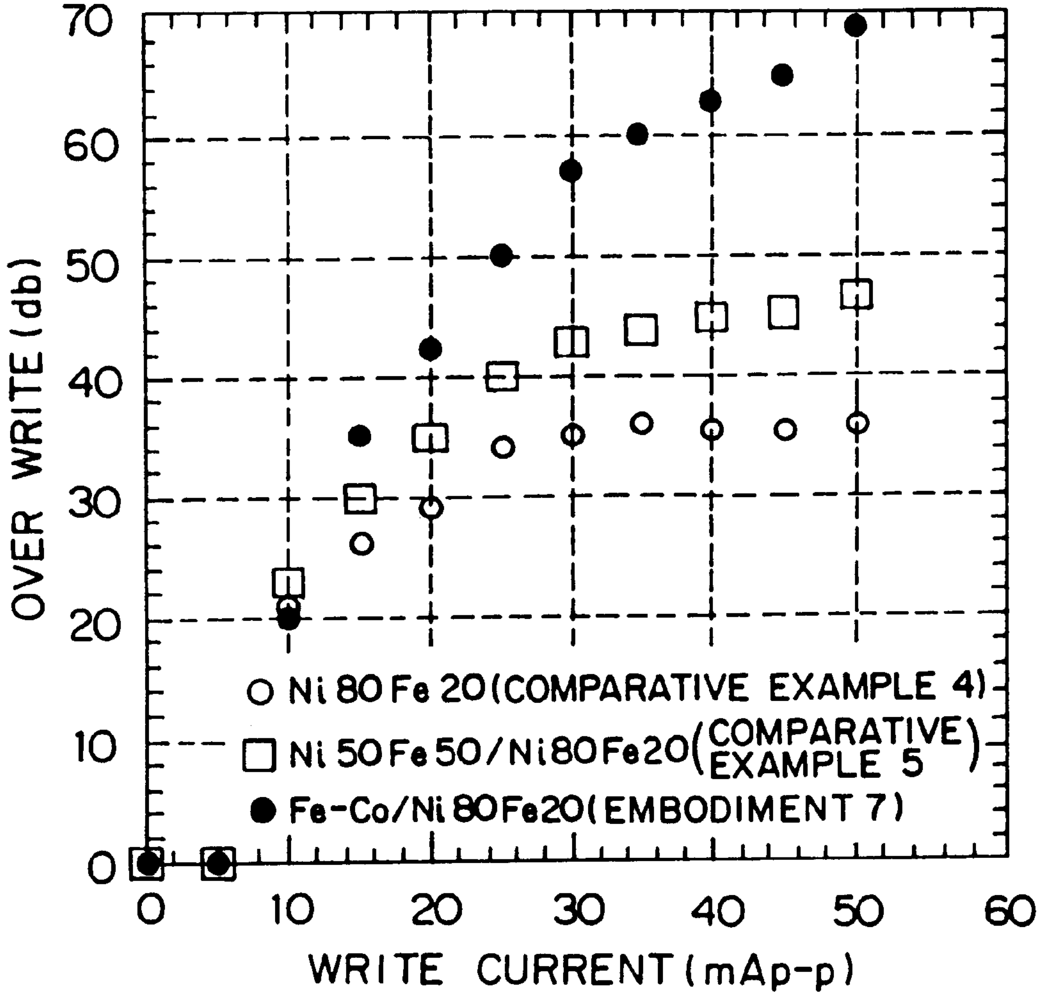
FIG. 15 is a diagram showing over-write characteristics of a magnetic head according to embodiment 6 of the present invention.

Overwrite characteristic when respective magnetic heads due to these embodiments and comparative examples were used are shown in FIG. 15. In this time, track width of recording magnetic pole was 2.2 μm, coercive force of recording medium was 20000 e. As obvious from FIG. 15, it is recognized that the magnetic heads of the present invention were superior to those of comparative examples 4, 5 in overwrite characteristic.

As obvious from the aforementioned embodiments, according to the present invention, since addition of small amount of rare earth element can materialize micro-crystallization and lower magnetostriction, soft magnetic alloy film of high saturation magnetic flux density, of excellent soft magnetic properties, further of excellent thermal stability can be provided. Through control of fine structure of soft magnetic alloy films of such as Fe—Co alloy or Fe—Co—Ni alloy, soft magnetic characteristic and saturation magnetic flux density can be improved. According to such soft magnetic alloy films, even in a magnetic head of which track width is made narrow, excellent recording magnetic field can be obtained.

Other than this, also in the case of a magnetic head which employs Fe—Co alloy or Fe—Co—Ni alloy described in the aforementioned embodiments, identical effect could be obtained.

What is claimed is:

1. A soft magnetic alloy film essentially consisting of magnetic alloy having composition expressed by general formula: $(Fe_{1-a-b}Co_aNi_b)_{100-x}Rx$ wherein in the formula, R denotes at least one kind of element selected from rare earth elements including Y, a, b and x satisfying $0 \leqq a < 1$, $0.3 \leqq 1-a-b < 0.95$, $0.5 < x \leqq 10$ at %:

wherein the soft magnetic alloy film has a first magnetic phase and a second magnetic phase, the first magnetic phase essentially consisting of crystalline substance which contains Fe, Fe—Co or Fe—Co—Ni as a main component and containing the R element in the range of 10 at % or less, the second magnetic phase of which crystal structure is different from that of the first magnetic phase and which contains the R element in the range of 0.5 at % or more.

2. A soft magnetic alloy film essentially consisting of magnetic alloy having composition expressed by general formula: $Fe_{1-a-b}Co_aNi_b$ wherein in the formula, a and b satisfying $0 \leqq a < 1$, $0 \leqq b < 1$, $0.3 \leqq 1-a-b < 0.95$:

wherein the soft magnetic alloy film has a first phase consisting of body-centered cubic structure, average grain diameter of the phase is in the range of 50 nm or less, and (110) plane thereof is grown in parallel to film plane of the soft magnetic alloy film.

3. The soft magnetic alloy film as set forth in claim 2:

wherein a full-width at half maximum of a rocking curve of an X-ray diffraction peak of (110) plane of the soft magnetic alloy film is in the range of 5 degree or less.

4. The soft magnetic alloy film as set forth in claim 1:

wherein the second phase consists of at least one kind of phase selected from amorphous phase containing the R element, compound phase containing the R element, face-centered cubic structure phase containing the R element, and segregation phase of the R element.

5. The soft magnetic alloy film as set forth in claim 3:

wherein average grain diameter of the second phase is 2.0 nm or less.

6. The soft magnetic alloy film as set forth in claim 1:

wherein grain diameter of the first phase is in the range of 50 nm or less.

7. The soft magnetic alloy film as set forth in claim 1:

wherein the first phase has body-centered cubic structure of which main component is Fe—Co or Fe—Co—Ni.

8. The soft magnetic alloy film as set forth in claim 7:

wherein (110) plane of the first phase is grown in parallel to film plane of the soft magnetic alloy film.

9. The soft magnetic alloy film as set forth in claim 1:

wherein the first phase has face-centered cubic structure at least as a part thereof.

10. The soft magnetic alloy film as set forth in claim 9:

wherein, in the phase having face-centered cubic structure in the first phase, (111) plane is grown in parallel to film plane of the soft magnetic alloy film.

11. The soft magnetic alloy film as set forth in claim 1:

wherein the soft magnetic alloy film further contains at least one kind of element selected from N, C and B in the range of 5.0 at % or less.

12. The soft magnetic alloy film as set forth in claim 11:

wherein the soft magnetic alloy film further contains at least one kind of element selected from Ti, Ta, Hf, Al, Zr, Cr, V, Mo, W, Mn and Nb in the range of 5.0 at % or less.

13. The soft magnetic alloy film as set forth in claim 1:

wherein the soft magnetic alloy film further contains at least one kind of element selected from Au, Ag, Rh, Ru, Pt, Pd and Ir in the range of 5.0 at % or less.

14. The soft magnetic alloy film as set forth in claim 1:

wherein the soft magnetic alloy film further contains Cu in the range of 5.0 at % or less.

15. The soft magnetic alloy film as set forth in claim 1:

wherein the soft magnetic alloy film is formed on a seed layer having at least one kind of crystal phase selected from body-centered cubic structure of which (110) plane is grown in parallel to film plane, face-centered cubic structure of which (111) plane is grown in parallel to film plane, and hexagonal closest packed structure of which (001) plane is grown in parallel to film plane.

16. A manufacturing method of a soft magnetic alloy film of which main component is Fe, Fe—Co or Fe—Co—Ni, containing body-centered cubic structure phase, comprising:

a step of forming the soft magnetic alloy film with sputtering method in which sputtering of target materials is done in a first atmosphere, and forming of the soft magnetic alloy film is done in a second atmosphere separated from the first atmosphere at a gas pressure in the range of 1.0 mTorr or less.

17. The manufacturing method of the soft magnetic film as set forth in claim 16:

wherein the soft magnetic alloy film is formed with collimation sputtering by a collimator between the first and the second atmosphere.

18. The manufacturing method of the soft magnetic film as set forth in claim 16:

wherein the soft magnetic alloy film is formed with differential exhaust sputtering in which each gas pressure in the first and the second atmosphere is controlled independently.

19. A magnetic head, comprising:

a magnetic gap disposed so as to be positioned on an air bearing surface;

a pair of magnetic poles disposed so as to sandwich the magnetic gap, at least one of the magnetic poles having a soft magnetic alloy film; and a coil disposed between the pair of magnetic poles so as to intersect with the magnetic poles, wherein the soft magnetic alloy film essentially consists of magnetic alloy having composition expressed by general formula: $(Fe_{1-a-b}Co_aNi_b)_{100-x}Rx$ wherein in the formula, R denotes at least one kind of element selected from rare earth elements including Y, a, b and x satisfying $0 \leqq a < 1$, $0 \leqq b < 1$, $0.3 \leqq 1-a-b < 0.95$, $0.5 < x \leqq 10$ at %: and wherein the soft magnetic alloy film has a first magnetic phase and a second magnetic phase, the first magnetic phase essentially consisting of crystalline substance which contains Fe, Fe—Co or Fe—Co—Ni as a main component and containing the R element in the range of 10 at % or less, the second magnetic phase containing the R element in the range of 0.5 at % or more.

20. The magnetic head as set forth in claim 19:

wherein the magnetic pole comprises a laminate film having a first soft magnetic alloy film consisting of the soft magnetic alloy film, and a second soft magnetic alloy film of lower saturation magnetic flux density than that of the soft magnetic alloy film.

21. The magnetic head as jet forth in claim 19:

wherein the magnetic pole comprises a magnetic pole tip having the soft magnetic alloy film, and an auxiliary magnetic pole which width is broader than that of the magnetic pole tip.

22. The soft magnetic alloy film as set forth in claim 5:

wherein the first phase has body-centered cubic structure of which main component is Fe—Co or Fe—Co—Ni.

23. The soft magnetic alloy film as set forth in claim 22:

wherein (110) plane of the first phase is grown in parallel to film plane of the soft magnetic alloy film.

24. The soft magnetic alloy film as set forth in claim 23:

wherein average grain diameter of the first phase is in the range of 50 mn or less.

* * * * *

UNITED STATES PATENT AND TRADEMARK OFFICE

CERTIFICATE OF CORRECTION

PATENT NO. : 6,132,892
DATED : October 17, 2000
INVENTOR(S) : Masatoshi Yoshikawa et al.

It is certified that error appears in the above-identified patent and that said Letters Patent is hereby corrected as shown below:

Column 4,
Line 4, "such EL fine structure" should read -- such a fine structure --.

Column 7,
Line 13, "Po" should read -- Mo --.

Column 8,
Line 29, "sity of the soft magnetic Lm alloy film 1 can be further" should read -- sity of the soft magnetic alloy film 1 can be further --;
Line 49, "tion of <100> direction $X\lambda^{100}$ and linear magnetostriction of" should read -- tion of <100> direction $\lambda^{100}$ and linear magnetostriction of --;
Line 56, "kin priority," should read -- priority --;

Column 9,
Line 48, "A m" should read -- A is --.

Column 13,
Line 13, "As;" should read -- As a --;
Line 63, "in-plane L magnetization" should read -- in-plane magnetization --;
Line 66, "has mean free H" should read -- has mean free --.

Column 14,
Line 18, "holder 14" should read -- holder 14. --

Column 15,
Line 16, "magnetic: head" should read -- magnetic head --;
Line 18, "$Al_2O_3$.TiC" should read -- $Al_2O_3 \cdot TiC$ --;
Line 63, "disposed The coil" should read -- disposed. The coil --.

Column 16,
Line 3, "L recording magnetic gap" should read -- recording magnetic gap --.

Column 17,
Line 44, "100 nm or less) m from a" should read -- 100 nm or less) from a --.

UNITED STATES PATENT AND TRADEMARK OFFICE

CERTIFICATE OF CORRECTION

PATENT NO. : 6,132,892
DATED : October 17, 2000
INVENTOR(S) : Masatoshi Yoshikawa et al.

It is certified that error appears in the above-identified patent and that said Letters Patent is hereby corrected as shown below:

Column 19,
Line 24, "earth elements L of" should read -- earth elements of --.

Column 22,
Line 34, "magnetic: characteristic due" should read -- magnetic characteristic --;
Line 56 & 57, "con-sisting L of a laminate" should read -- con-sisting of a laminate --;
Line 64, "20000 e." should read -- 2000 e. --.

Column 23,
Line 57, "claim 3:" should read -- claim 4 --.

Column 26,
Line 1, "jet" should read -- set --.

Signed and Sealed this

Eighteenth Day of September, 2001

*Attest:*

Nicholas P. Godici

NICHOLAS P. GODICI

*Attesting Officer* *Acting Director of the United States Patent and Trademark Office*